(12) United States Patent
Felt et al.

(10) Patent No.: US 8,618,935 B2
(45) Date of Patent: Dec. 31, 2013

(54) SYSTEMS AND METHODS FOR ENHANCING A USER VISIT TO A SITE PREMISES

(75) Inventors: Michelle Felt, Randolph, NJ (US); Farida Saeed, Boonton, NJ (US); Nader Gharachorloo, Ossining, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 788 days.

(21) Appl. No.: 12/611,629

(22) Filed: Nov. 3, 2009

(65) Prior Publication Data

US 2011/0105092 A1    May 5, 2011

(51) Int. Cl.
| | |
|---|---|
| G08B 21/00 | (2006.01) |
| G08B 5/24 | (2006.01) |
| G08G 1/09 | (2006.01) |
| G08G 1/123 | (2006.01) |
| H04H 40/00 | (2008.01) |
| H04M 3/42 | (2006.01) |
| H04M 1/66 | (2006.01) |
| H04W 24/00 | (2009.01) |
| H04B 7/00 | (2006.01) |
| G06F 15/16 | (2006.01) |
| H04N 7/18 | (2006.01) |

(52) U.S. Cl.
USPC ........ 340/540; 340/905; 340/995.1; 340/488; 455/3.06; 455/414.1; 455/456.3; 455/41.3; 455/410; 709/201; 348/143

(58) Field of Classification Search
USPC ............. 340/905, 995.1, 488, 491, 988, 991, 340/990, 995; 701/117, 204, 200, 208, 201, 701/211, 213, 300; 455/3.03, 3.06, 414.1, 455/410, 415, 556.1, 66.1; 709/217, 219, 709/223, 228

See application file for complete search history.

(56) References Cited

U.S. PATENT DOCUMENTS

| | | | |
|---|---|---|---|
| 5,862,325 A * | 1/1999 | Reed et al. ..................... 709/201 |
| 5,948,040 A * | 9/1999 | DeLorme et al. ............. 701/426 |
| 7,580,699 B1 * | 8/2009 | Shaw et al. .................... 455/410 |
| 2003/0036842 A1* | 2/2003 | Hancock ....................... 701/200 |
| 2003/0117297 A1* | 6/2003 | Obradovich et al. ......... 340/905 |
| 2005/0157169 A1* | 7/2005 | Brodsky et al. ............... 348/143 |
| 2006/0259957 A1* | 11/2006 | Tam et al. .......................... 726/3 |
| 2007/0149116 A1* | 6/2007 | White et al. ................. 455/3.06 |
| 2007/0279394 A1* | 12/2007 | Lampell et al. ............... 345/173 |
| 2008/0248815 A1* | 10/2008 | Busch ........................ 455/456.5 |

* cited by examiner

*Primary Examiner* — Jennifer Mehmood
*Assistant Examiner* — Mirza Alam

(57) ABSTRACT

Exemplary systems and methods for enhancing a user visit to a site premises are disclosed. An exemplary method includes a mobile device tracking a geographic location of the mobile device, accessing site data associated with a site premises, and providing an interactive user interface configured to enhance a visit of a user of the mobile device to the site premises based on the site data associated with the site premises and the geographic location of the mobile device within the site premises. In certain embodiments, an output may be selected based on the geographic location of the mobile device within the site premises and provided via the interactive user interface for experiencing by the user of the mobile device. Corresponding systems and methods are also disclosed.

28 Claims, 20 Drawing Sheets

SYSTEMS AND METHODS FOR ENHANCING A USER VISIT TO A SITE PREMISES

BACKGROUND INFORMATION

Operators of sites such as museums and amusement parks typically seek to provide visitors with good experiences. To this end, site operators create, distribute, and/or post information that may be helpful to visitors. For instance, an operator of an amusement park or a museum typically distributes printed maps of the amusement park or the museum to guide visitors to various attractions within the amusement park or exhibits within the museum.

However, it is not uncommon for a visitor to unintentionally miss a particular attraction or exhibit within a site or to unintentionally backtrack to a previously experienced attraction or exhibit within a site. Moreover, it is not uncommon for a visitor to experience delay or frustration when trying to find a particular location within a site. For example, when a visitor wants to find a restroom, the visitor may first need to find and use a printed map of the site or a posted site directory to locate the nearest restroom. In some cases, the route to the restroom may be convoluted enough to confuse the visitor. For these and other reasons, there remains room to enhance experiences of users visiting sites.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Systems and methods for enhancing a user visit to a site premises are described herein. As used herein, the term "site premises" may refer to a geographic space occupied by a structure or set of structures and/or intended for an event or purpose. Examples of site premises may include, without limitation, a museum, an amusement park, a theme park, a conference center, a mall, a store (e.g., a department store and an outlet store), an airport, a building, a hotel, and a resort. A site premises may include "site features," which, as used herein, may refer to any feature, event, service, and/or location within the site premises. Examples of site features may include, without limitation, exhibits (e.g., museum exhibits), attractions (e.g., amusement park attractions), events, restrooms, eateries, drinking fountains, elevators, escalators, stairways, pathways, exits (e.g., emergency exits), services e.g., (emergency services), sections, areas, and locations within a site premises. For example, a site premises may include a museum, and site features within the museum may include one or more museum exhibits, restrooms, food courts, and special events within the museum.

In certain embodiments, an interactive user interface may be provided by a user device. The interactive user interface may include one or more tools configured to enhance a user visit to a site premises such as by facilitating a user definition of a planned route within the site premises and/or by providing output, for experiencing by a user, based on site data associated with the site premises and/or a geographic location of a mobile user device within the site premises. For example, the output may include one or more alerts provided via the interactive user interface. The alerts may be based on the geographic location of the mobile user device within the site premises and may be configured to notify a user of the mobile device of various items related to the user's visit to the site premises, such as that the user has missed a site feature or backtracked to a previously visited site feature during a visit to the site premises. The interactive user interface may also provide the user of a mobile device with access to special events associated with the site premises, such as a location-based treasure hunt event provided within the site premises. Examples of systems and methods for enhancing a user visit to a site premises will now be described in more detail with reference to the accompanying drawings.

Figure 1:
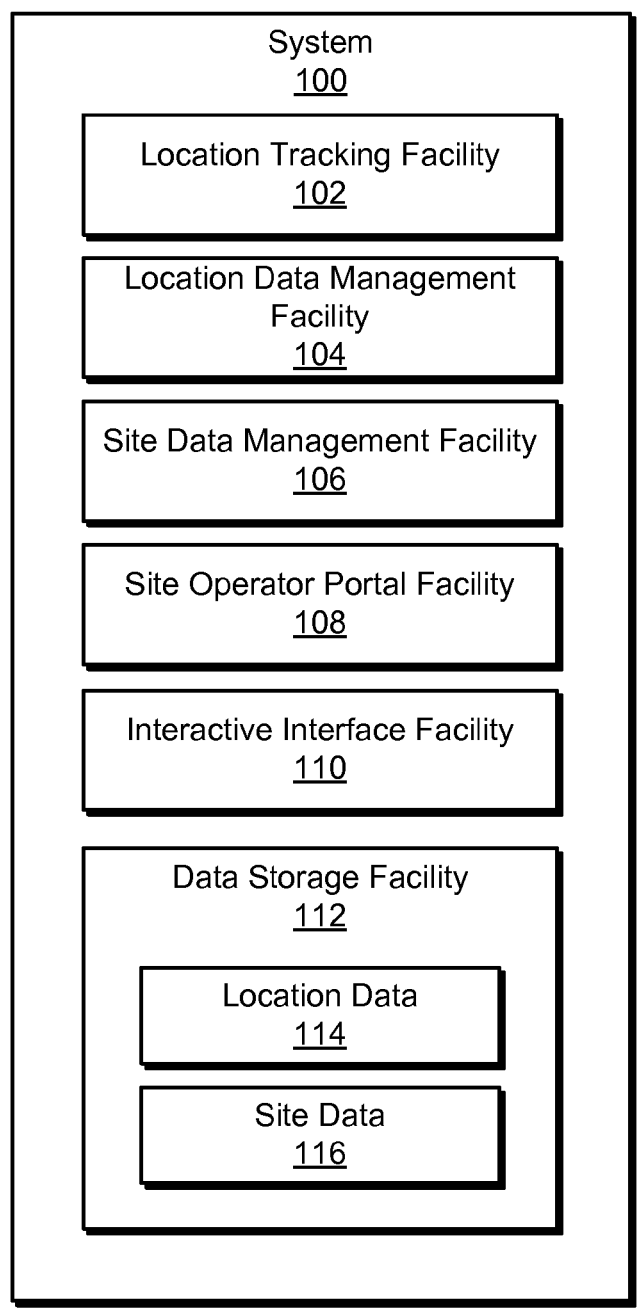
FIG. 1 illustrates an exemplary system for enhancing a user visit to a site premises.

FIG. 1 illustrates an exemplary interactive site premises interface system 100 (or simply "system 100"). While an exemplary system 100 is shown in FIG. 1, the components and configuration of system 100 illustrated in FIG. 1 are not intended to be limiting. Additional or alternative components and/or configurations may be used in other embodiments. In certain alternative embodiments, for example, one or more of the components shown in FIG. 1 may be omitted or combined.

System 100 may include, but is not limited to, a location tracking facility 102, a location data management facility 104, a site data management facility 106, a site operator portal facility 108, an interactive interface facility 110, and a data storage facility 112 selectively and communicatively coupled to one another. Any suitable communication technologies, including any other communication technologies mentioned herein, may be employed to facilitate communications between facilities 102-112.

Location tracking facility 102 may be configured to track a geographic location of a mobile device associated with a user. The tracking of the geographic location of the mobile device may be performed in any suitable way and using any suitable technologies, including, without limitation, Global Positioning System ("GPS") technologies and terrestrial signaling triangulation technologies. As an example, a mobile device may include a mobile phone device, the location of which may be tracked using GPS and/or cellular phone wireless signaling triangulation technologies. In certain embodiments, location tracking facility 102 may track the geographic location of a mobile device relative to (e.g., within) a particular geographic space (e.g., within a site premises). One or more wireless signaling transmitters may be employed to boost reception of location tracking signals within a site premises.

Location data management facility 104 may be configured to maintain location data generated by location tracking facility 102. For example, location data management facility 104 may receive location data representative of one or more locations of one or more mobile devices from location tracking facility 102. Location data management facility 104 may aggregate and maintain the location data as location data 114 within data storage facility 112. Location data 114 may include any information descriptive of or otherwise related to tracked geographic locations of one or more mobile devices. As described further below, location data 114 may be used to provide one or more location-based services, tools, outputs, and/or interfaces to one or more users visiting and/or planning to visit a site premises.

Site data management facility 106 may be configured to collect and maintain site data associated with one or more site premises. The site data may be maintained by site data management facility 106 as site data 116 within data storage facility 112. Site data 116 may include any information descriptive of or otherwise related to one or more site premises. For example, site data 116 may include geographic location data indicating one or more geographic locations associated with a site premises and/or site features within a site premises. Site data 116 may also include data descriptive of or otherwise related to a site premises and/or site features within a site premises, such as a list of available site features and/or descriptions of site features available within the site premises. Other examples of site data may include, without limitation, maps of site premises, proximity maps of portions of site premises, images, text, media content (e.g., virtual tour media content), and any other data associated with site premises.

Site data management facility 106 may collect site data 116 from one or more sources, including from one or more operators of site premises. For example, site operator portal facility 108 may be configured to provide a portal through which one or more operators of one or more site premises may provide (e.g., upload) site data 116 to site data management facility 106. For example, site operator portal facility 108 may provide a Web or FTP portal accessible by one or more operators registered to access and provide site data 116 to system 100. Accordingly, operators may be able to utilize operator devices to provide and manage site data 116 related to their respective site premises.

Site data 116 may also be generated based on location data 114. For example, site data management facility 106 may be configured to access and use location data 114 to generate one or more location reports for a site premises. A location report for a site premises may include any data descriptive of the geographic locations of one or more mobile devices within the site premises. For example, a location report may include a location history of a mobile device within the site premises. Such location reports may be added to site data 116 and/or may be used to generate data to be added to site data 116. For example, location reports may be used to generate data specifying high and/or low traffic areas within a site premises. As described further below, such data may be used to enhance an experience of a user visiting or planning to visit the site premises.

Site data 116 may also be collected from one or more user devices. For example, user feedback such as user ratings of site features within a site premises may be collected and added to site data 116 by site data management facility 106. The collected user ratings may be used to generate data specifying popular and/or unpopular site features within a site premises. As described further below, site data 116 may be used to enhance an experience of a user visiting or planning to visit the site premises.

Interactive interface facility 110 may provide an interactive user interface configured to enhance an experience of a user visiting or planning to visit a site premises represented by site data 116. For example, interactive interface facility 110 may provide a mobile user device with access to site data 116 associated with a site premises, including interactive maps of the site premises. In addition, interactive interface facility 110 may provide location-based alerts to a mobile user device. For example, an alert may be configured to notify a user that the user has missed a site feature within a site premises or that the user has backtracked to a previously visited site feature within a site premises. Other tools and/or output that may be provided via an interactive user interface may include, without limitation, directions to a particular site feature located within a site premises, virtual tours of a site premises and/or one or more site features within a site premises, site premises route planning tools, and notifications of specials within a site premises. Examples of these and other tools and/or output that may be provided by interactive interface facility 110 via an interactive user interface are described in more detail further below.

Data storage facility 112 may be configured to store electronic data including, without limitation, location data 114 and site data 116. Data storage facility 112 may include and/or employ any data storage devices, computer-readable media, and technologies suitable for storing electronic data.

System 100, including facilities 102-112, may include any computer hardware and/or computer-implemented instructions (e.g., software), or combinations of computer-implemented instructions and hardware, configured to perform one or more of the processes described herein. In particular, system 100 may be implemented on one physical computing device or may be implemented on more than one physical computing device. Accordingly, system 100 may include any number of computing devices, and may employ any of a number of computer operating systems.

One or more of the processes described herein may be implemented at least in part as instructions executable by one or more computing devices. In general, a processor (e.g., a microprocessor) receives instructions, from a computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Common forms of computer-readable media include, for example, a floppy disk, flexible disk, hard disk, magnetic tape, any other magnetic medium, a CD-ROM, DVD, any other optical medium, a RAM, a DRAM a PROM, an EPROM, a FLASH-EEPROM, any other memory chip or cartridge, or any other medium from which a computer can read.

Figure 2:
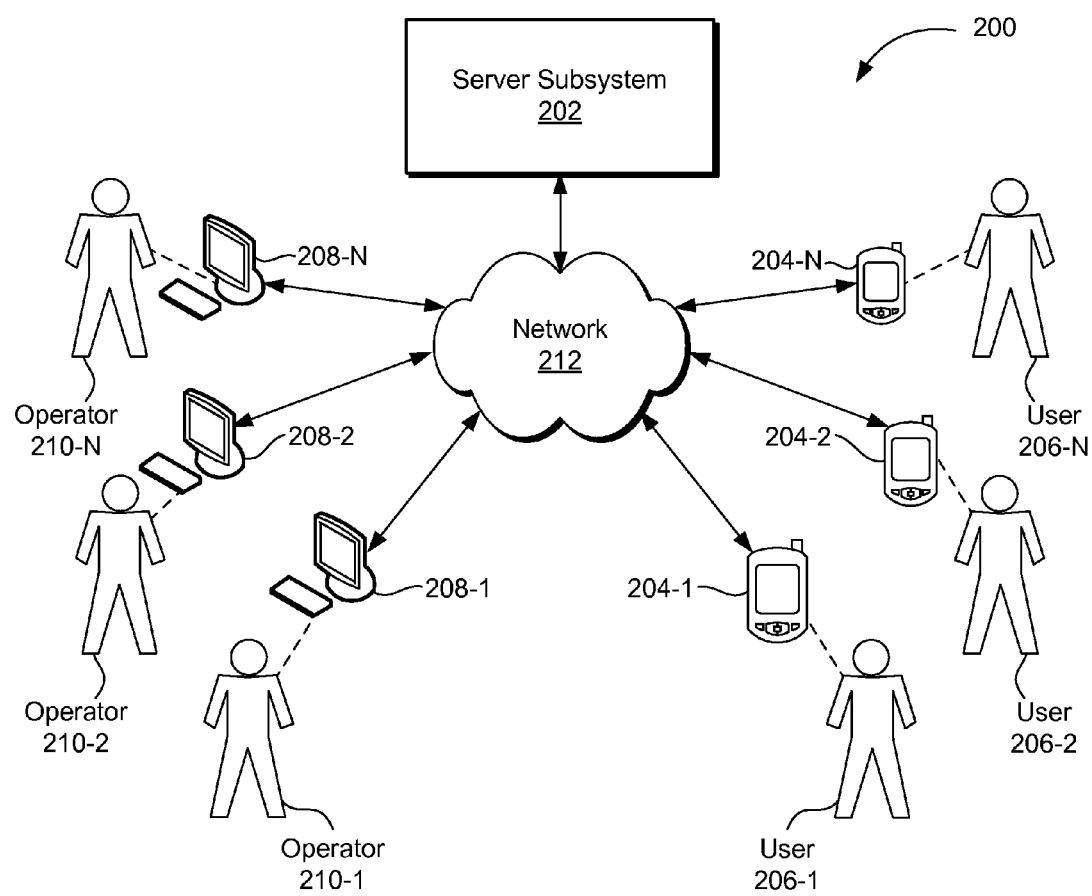
FIG. 2 illustrates an exemplary implementation of the system of FIG. 1.

FIG. 2 illustrates an exemplary implementation 200 of system 100. As shown in FIG. 2, implementation 200 may include a server subsystem 202 selectively and communicatively connected to a plurality of user devices 204 (e.g., user devices 204-1 through 204-N) associated with a plurality of users 206 (e.g., users 206-1 through 206-N) and to a plurality of operator devices 208 (e.g., operator devices 208-1 through 208-N) associated with a plurality of operators 210 (e.g., operators 210-1 through 210-N) of one or more site premises.

Server subsystem 202 may communicate with devices 204 and 208 using any communication platforms and technologies suitable for transporting data and/or communication signals, including known communication technologies, devices, media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, wireless communication technologies, in-band and out-of-band signaling technologies, control signaling technologies, and other suitable communications technologies. Any suitable registration and/or authentication technologies may be employed to register and/or authenticate devices 204 and 208, users 206, and/or operators 210 for communications with server subsystem 202.

Server subsystem 202 may communicate with devices 204 and 208 via a network 212, which may include one or more networks, including, but not limited to, wireless networks (Wi-Fi networks), (e.g., wireless communication networks), mobile telephone networks (e.g., cellular telephone networks), closed media networks, open media networks, closed communication networks, open communication networks, satellite networks, navigation networks, broadband networks, narrowband networks, voice communication networks (e.g., VoIP networks), the Internet, and any other networks capable of carrying data and/or communications signals between devices 204 and 208 and server subsystem 202. Communications between server subsystem 202 and devices 204 and 208 may be transported using any one of above-listed networks, or any combination or sub-combination of the above-listed networks. In certain exemplary embodiments, network 212 may include a mobile telephone network and the Internet, and server subsystem 202 may communicate with user devices 204 via the mobile telephone network and with operator devices 208 via the Internet.

Operator devices 208 may include any computing devices associated with operators 210 and configured to communicate with server subsystem 202. Operators 210 may utilize operator devices 208 to provide (e.g., upload) site data to server subsystem 202, which may receive, aggregate, store, and maintain the site data. Operators 210 may also utilize operator devices 208 to manage site data maintained in server subsystem 202. For example, an operator 210 may modify site data such as by changing site data identifying a geographic location of a site feature within a site premises to reflect a relocation of the site feature within the site premises.

User devices 204 may include any mobile devices (e.g., mobile phone devices) associated with users 206 and configured to communicate with server subsystem 202. Users 206 may utilize user devices 204 to access site data from server subsystem 202. In addition, users 206 may utilize user devices 204 to access one or more interactive user interface tools, operations, and/or services provided by server subsystem 202. While FIG. 2 shows each user 206 to be associated with one user device 204 in the form of a mobile computing device, this is illustrative only. In certain embodiments, a user 206 may utilize additional access devices (e.g., a set-top-box device, a gaming console device, a personal computer device, etc.) to access certain data, tools, operations, and/or services provided by server subsystem 202. However, certain data, tools, operations, and/or services (e.g., location-based tools, operations, and/or services) provided by server subsystem 202 may be specific to a mobile device associated with a user 206.

Server subsystem 202 may include one or more computing devices (e.g., one or more server devices) implementing one or more components of system 100. In certain embodiments, system 100 may be implemented entirely by or within server subsystem 202. In other embodiments, components of system 100 may be distributed across server subsystem 202 and devices 204 and/or 208. For example, a user device 204 may include a client (e.g., a client application) implementing one or more components of system 100.

Figure 3:
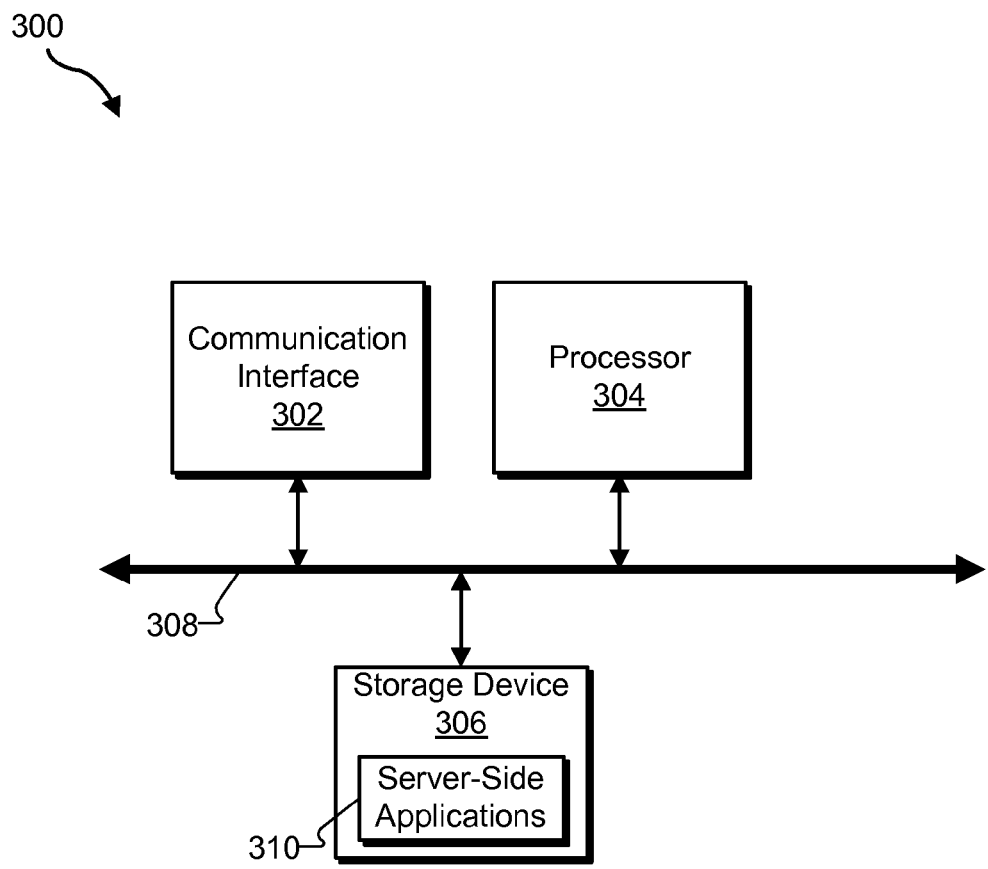
FIG. 3 illustrates exemplary components of a server device.

FIG. 3 illustrates an exemplary server device 300 that may be included within and/or that may implement server subsystem 202. As shown, server device 300 may include a communication interface 302, a processor 304, and a storage device 306 communicatively connected via a communication infrastructure 308. While an exemplary server device 300 is shown in FIG. 3, the components illustrated in FIG. 3 are not intended to be limiting. Additional or alternative components may be used in other embodiments. Components of server device 300 shown in FIG. 3 will now be described in additional detail.

Communication interface 302 may be configured to communicate with one or more computing devices, including user devices 204. In particular, communication interface 302 may be configured to transmit and/or receive communication signals and/or data to/from user devices 204. In certain embodiments, communication interface 302 may be further configured to communicate with one or more operator devices 208. Examples of communication interface 302 may include, without limitation, a wireless network interface (such as a wireless network interface card), a modem, an RF transceiver, and any other suitable interface. Communication interface 302 may be configured to interface with any suitable communication media, protocols, and formats, including any of those mentioned above.

Processor 304 generally represents any type or form of processing unit capable of processing data or interpreting, executing, and/or directing execution of one or more of the instructions, processes, and/or operations described herein. Processor 304 may execute and/or direct execution of operations in accordance with one or more server-side applications 310 or other computer-executable instructions such as may be stored in storage device 306 or another computer-readable medium.

Storage device 306 may include one or more data storage media, devices, or configurations and may employ any type, form, and combination of data storage media and/or device. For example, storage device 306 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 306. For example, data representative of one or more executable server-side applications 310 configured to direct processor 304 to perform any of the operations described herein may be stored within storage device 306. Location data 114 and site data 116 may also be stored in storage device 306. In some examples, data may be arranged in one or more databases residing within storage device 306.

In some examples, any of the facilities described herein may be implemented by or within one or more components of server device 300. For example, one or more server-side applications 310 residing within storage device 306 may be configured to direct processor 304 to perform one or more server-side processes or functions associated with location tracking facility 102, location data management facility 104, site data management facility 106, site operator portal facility 108, and interactive interface facility 110. Likewise, data storage facility 112 may be implemented by or within storage device 306.

Figure 4:
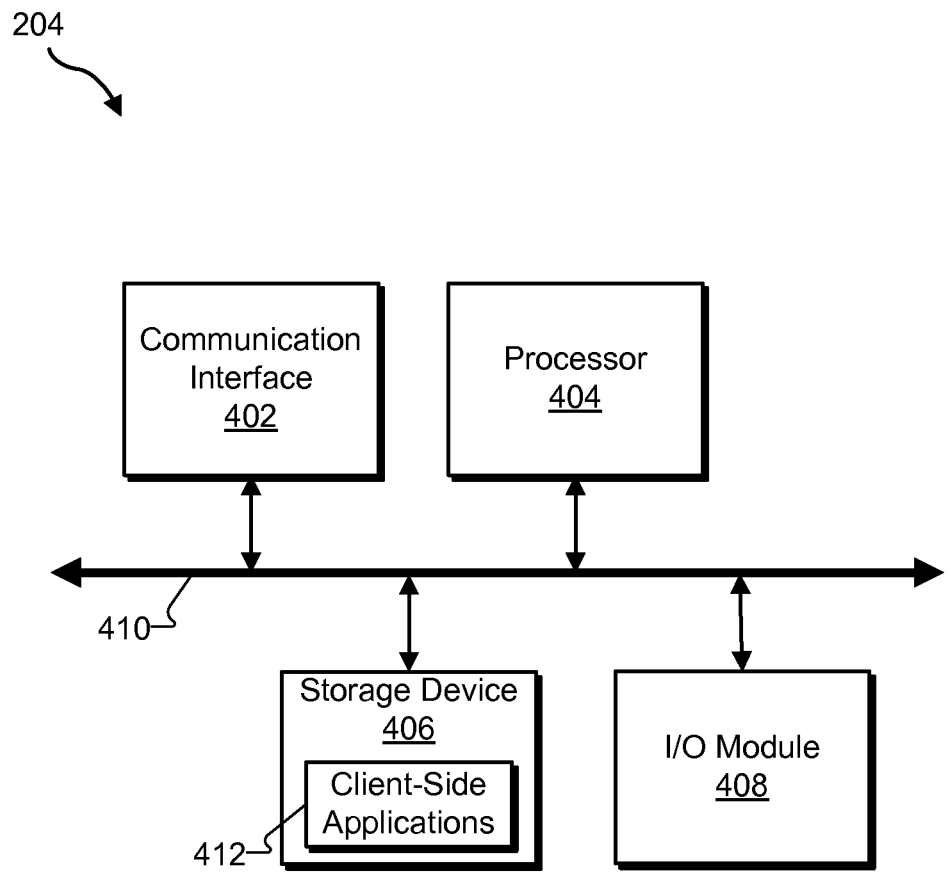
FIG. 4 illustrates exemplary components of a user device configured to provide an interactive user interface.

FIG. 4 illustrates an exemplary user device 204. As shown, user device 204 may include a communication interface 402, a processor 404, a storage device 406, and an input/output ("I/O") module 408 communicatively connected via a communication infrastructure 410. While an exemplary user device 204 is shown in FIG. 4, the components illustrated in FIG. 4 are not intended to be limiting. Additional or alternative components may be used in other embodiments. Components of user device 204 shown in FIG. 4 will now be described in additional detail.

Communication interface 402 may be configured to communicate with one or more computing devices, including server subsystem 202 and/or server device 300. In particular, communication interface 402 may be configured to transmit and/or receive communication signals and/or data to/from server subsystem 202. Examples of communication interface 402 may include, without limitation, a wireless network interface (such as a wireless network interface card), a modem, an RF transceiver, and any other suitable interface. Communication interface 402 may be configured to interface with any suitable communication media, protocols, and formats, including any of those mentioned above.

Processor 404 generally represents any type or form of processing unit capable of processing data or interpreting, executing, and/or directing execution of one or more of the instructions, processes, and/or operations described herein. Processor 404 may execute and/or direct execution of operations in accordance with one or more client-side applications 412 or other computer-executable instructions such as may be stored in storage device 406 or another computer-readable medium.

Storage device 406 may include one or more data storage media, devices, or configurations and may employ any type, form, and combination of data storage media and/or device. For example, storage device 406 may include, but is not limited to, a hard drive, network drive, flash drive, magnetic disc, optical disc, RAM, DRAM, other non-volatile and/or volatile data storage units, or a combination or sub-combination thereof. Electronic data, including data described herein, may be temporarily and/or permanently stored in storage device 406. For example, data representative of one or more executable client-side applications 412 configured to direct processor 404 to perform any of the client-side operations described herein may be stored within storage device 406. Location data 114 and site data 116 may also be stored in storage device 406. In some examples, data may be arranged in one or more databases residing within storage device 406.

I/O module 408 may be configured to receive user input and provide user output and may include any hardware, firmware, software, or combination thereof supportive of input and output capabilities. For example, I/O module 408 may include hardware and/or software for capturing user input, including, but not limited to, a keyboard or keypad, a touch screen component (e.g., touch screen display), a receiver (e.g., an RF or infrared receiver), and/or one or more input buttons.

I/O module 408 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 408 is configured to provide graphical data to a display for presentation to a user. The graphical data may be representative of one or more graphical user interfaces ("GUIs"), GUI views, and/or any other view as may serve a particular application.

In some examples, any of the facilities described herein may be implemented by or within one or more components of user device 204. For example, one or more client-side applications 412 residing within storage device 406 may be configured to direct processor 404 to perform one or more client-side processes or functions associated with location tracking facility 102, location data management facility 104, site data management facility 106, site operator portal facility 108, and interactive interface facility 110. Likewise, data storage facility 112 may be implemented by or within storage device 406.

Exemplary processes, operations, tools, options, outputs, and/or user interfaces for enhancing a visit to a site premises will now be described. One or more of the exemplary processes, operations, tools, options, outputs, and/or user interfaces may be performed and/or provided by system 100, server subsystem 202, and/or devices 204, 208, and/or 300. For illustrative purposes only, the following examples will be described in terms of a user device 204 in the form of a mobile device and server subsystem 202 interacting one with another.

A user of a mobile device may desire to access one or more of the processes, operations, tools, options, outputs, and/or user interfaces described herein for enhancing a visit to a site premises. In certain embodiments, the user may register the mobile device with server subsystem 202 and download and install one or more interactive site premises interface client applications configured to be executed on the mobile device such that the mobile device may perform one or more of the client-side interactive site premises interface operations described herein. Additionally or alternatively, the mobile device may access one or more of the interactive site premises interface processes, operations, tools, outputs, and/or options described herein from server subsystem 202 using a service-oriented architecture.

The user of the mobile device may desire to visit a particular site premises such as an amusement park. The user may utilize the mobile device to initiate a search of site data 116 maintained by server subsystem 202 for site data associated with the amusement park. If site data associated with the amusement park is found in site data 116, the mobile device may access the site data. In some examples, this may include downloading at least a portion of the site data for the amusement park to the mobile device. For instance, the mobile device may download an interactive map of the amusement park.

While the above example of accessing site data from server subsystem 202 is described in a context of a user of the mobile device initiating a search for the site data, this is illustrative only. In other examples, the mobile device may automatically access site data for the amusement park or other site premises from server subsystem 202. For example, the mobile device may track and provide data representative of its geographic location to server subsystem 202, which may compare the geographic location of the mobile device to geographic location data associated with one or more site premises represented by site data 116. If server subsystem 202 determines from the comparison that the mobile device is located within a particular site premises or within a predefined proximity of the site premises, server subsystem 202 may automatically provide site data for the site premises to the mobile device.

Thus, when the user carries the mobile device nearby or into a site premises, the mobile device may automatically access site data for the site premises.

Figure 5:
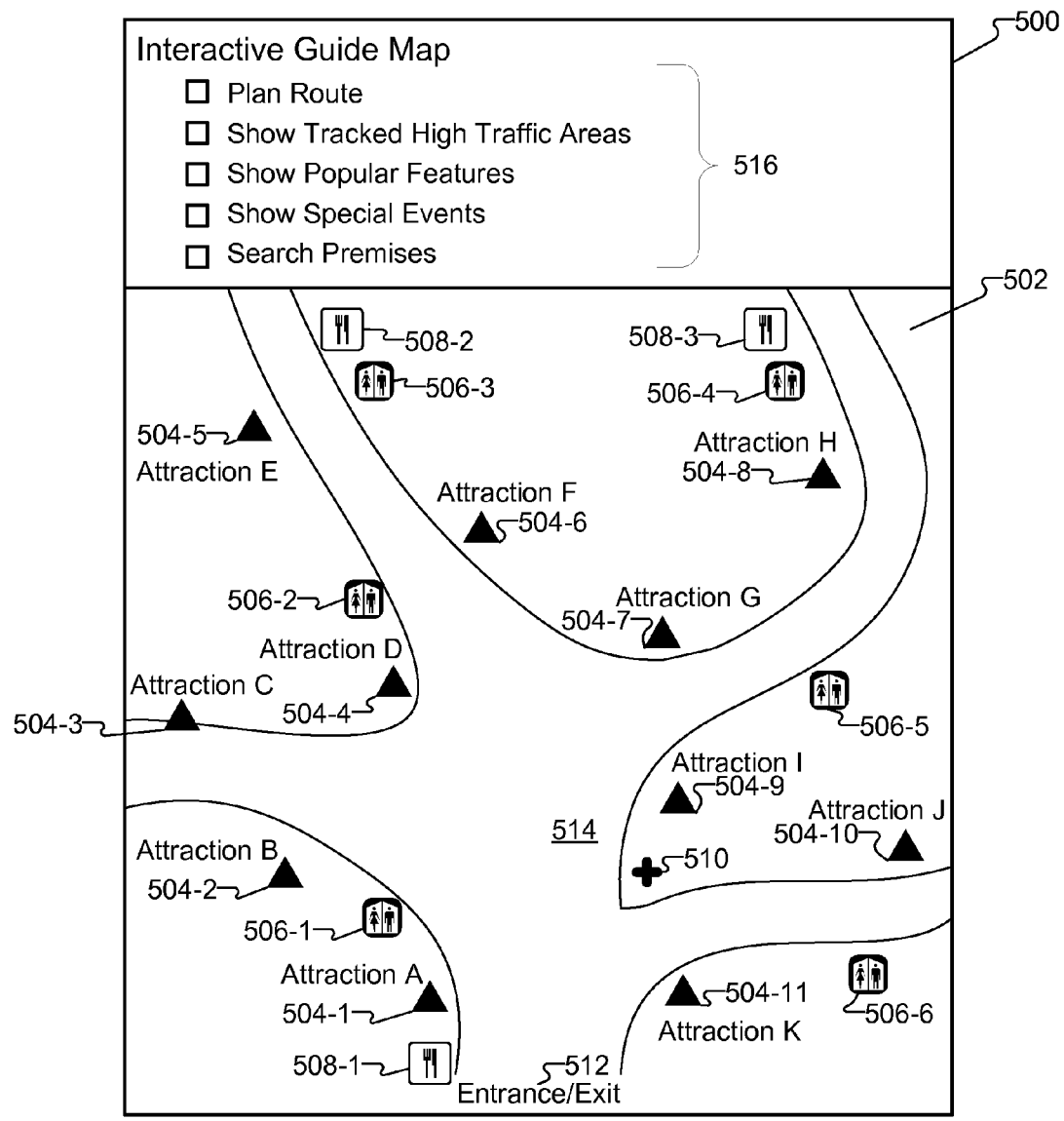
FIGS. 5-16 illustrate exemplary views of an exemplary interactive graphical user interface.

The mobile device may be configured to present site data for the site premises to a user of the mobile device. FIG. 5 illustrates an exemplary interactive graphical user interface ("GUI") 500 may be displayed by the mobile device. As shown, GUI 500 may include an interactive map 502 of at least a portion of a site premises such as an amusement park. Interactive map 502 may comprise a full-detail and/or full-feature interactive map or an interactive map that is scaled down in scope, detail, and/or functionality to accommodate a mobile device with limited resources.

One or more site features within the site premises, as well as the geographic locations of the site features within the site premises, may be visually represented in interactive map 502. In the illustrated example, visually indicated site features of the site premises include attractions 504 (e.g., attractions 504-1 through 504-11 identified as "Attractions A-K," respectively, in FIG. 5), restrooms 506 (e.g., restrooms 506-1 through 506-6), eateries 508 (e.g., eateries 508-1 through 508-3), a first aid station 510, an entrance/exit 512, and a pathway layout 514.

GUI 500 may provide one or more tools configured to facilitate user interaction with interactive map 502. For example, GUI 500 may include a plurality of user selectable options 516 for interacting with interactive map 502 and/or site data associated with the site premises. As shown in FIG. 5, options 516 may include an option for planning a route within the site premises, an option for displaying tracked high traffic areas within the site premises, an option for displaying popular features within the site premises, an option for displaying special events within the site premises, and an option for searching for a site feature located within the site premises and displaying one or more search results site features.

Figure 6:
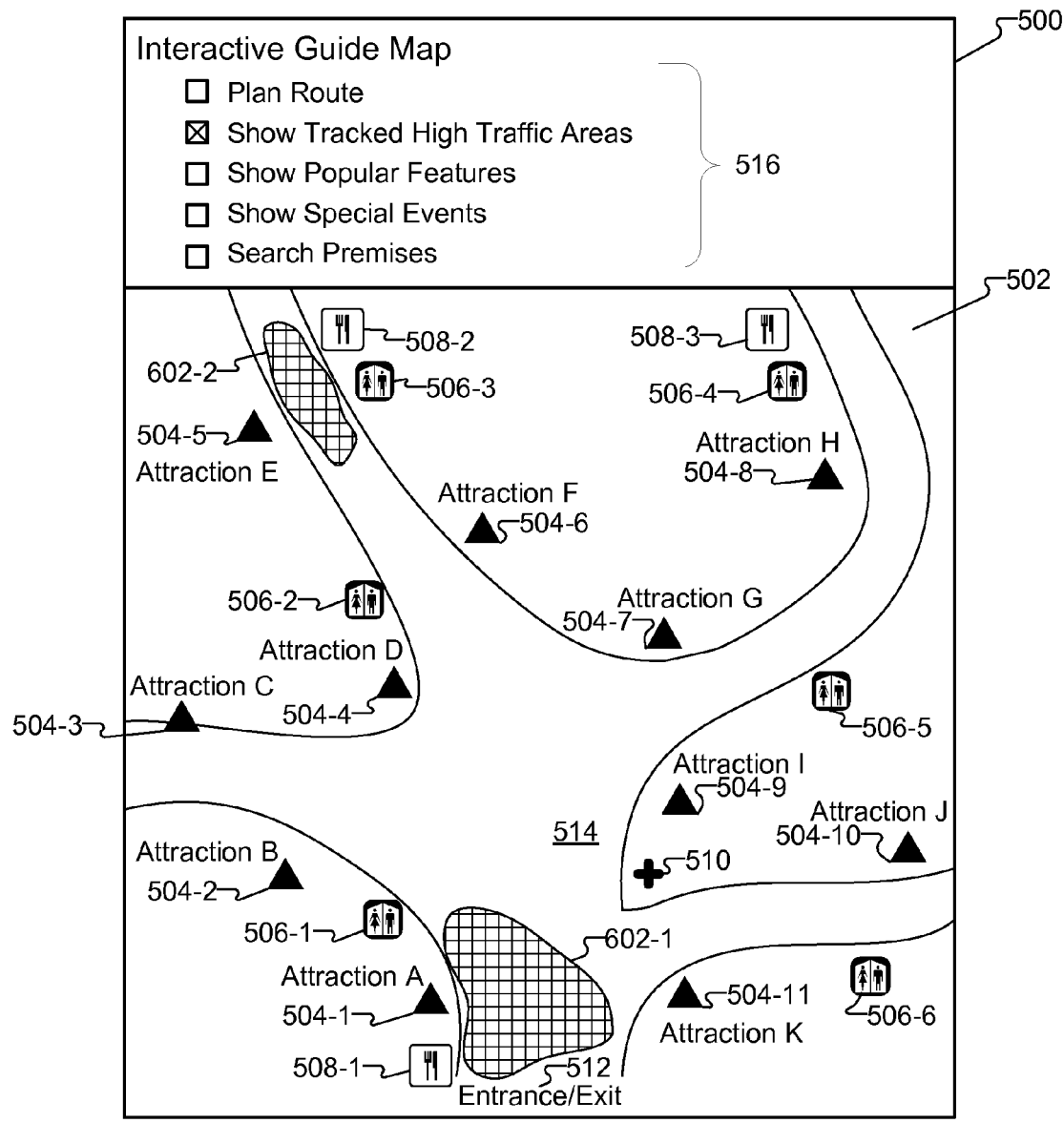

To illustrate, when the user of the mobile device selects the "show tracked high traffic areas" option, the mobile device may detect the user selection and update GUI 500 to visually indicate one or more high traffic areas within the site premises. For example, FIG. 6 illustrates GUI 500 with visual indicators 602 (e.g., visual indicators 602-1 and 602-2) of locations of high traffic areas within the site premises displayed therein. The locations of high traffic areas within the site premises may be determined based on tracked locations of participating mobile devices within the site premises over time. For example, server subsystem 202 may receive location data from mobile devices, aggregate the location data, and use the location data to identify traffic patterns, rates, and/or densities within the site premises. Server subsystem 202 may make such data, including data indicating high traffic areas, available to one or more user devices.

The user of the mobile device may utilize the data indicating high traffic areas in any suitable way. For example, the user of the mobile device may plan to avoid high traffic areas within the site premises. Alternatively, the user of the mobile device may equate high traffic areas with high levels of interest in one or more site features located in and/or proximate the high traffic areas and may plan to visit site features within and/or nearby the high traffic areas.

Figure 7:
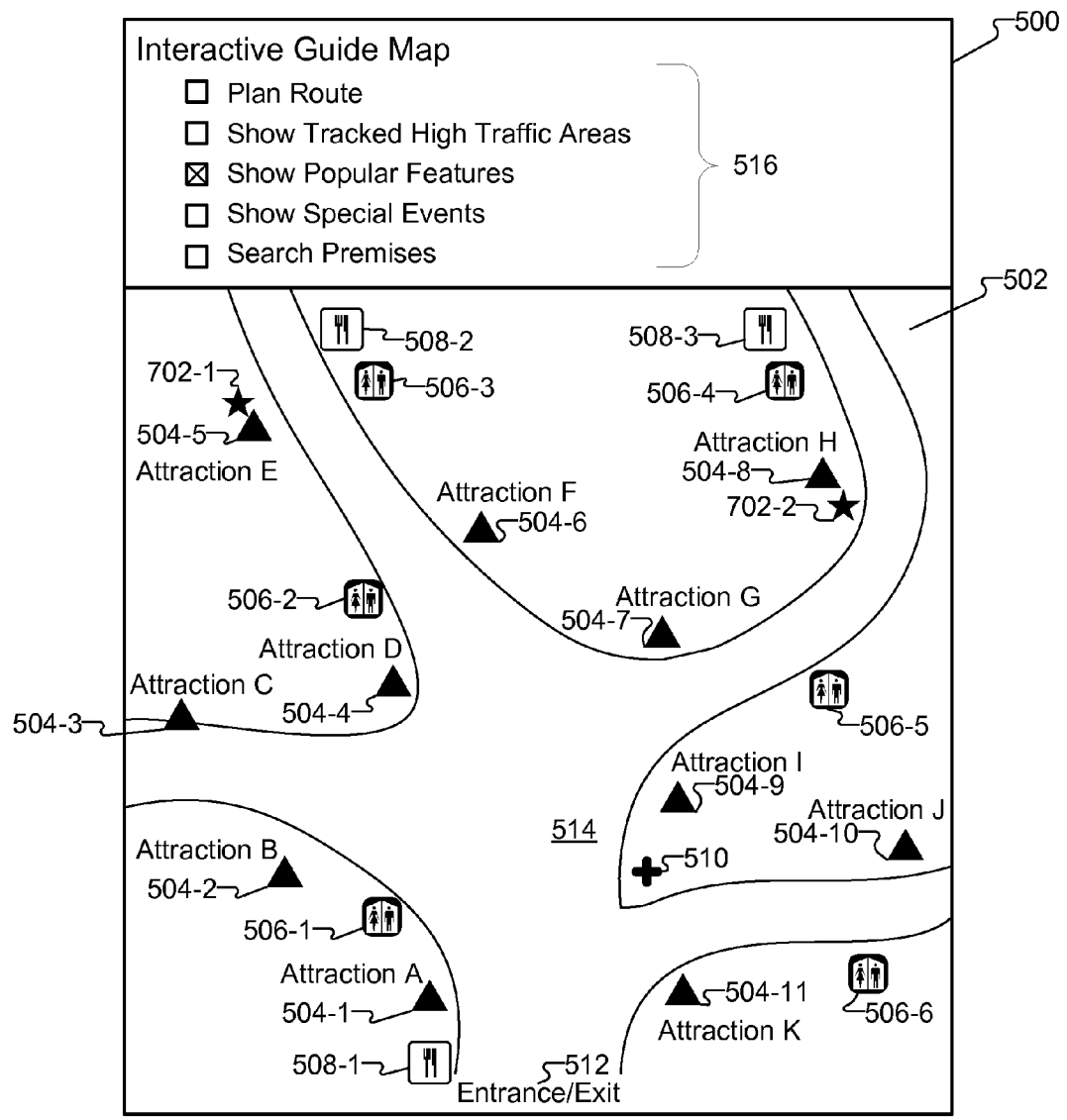

When the user of the mobile device selects the "show popular features" option, the mobile device may detect the user selection and update GUI 500 to visually indicate one or more popular site features within the site premises. For example, FIG. 7 illustrates GUI 500 with visual indicators 702 (e.g., visual indicators 702-1 and 702-2) of popular attractions 504-5 and 504-8 within the site premises displayed therein. Alternatively, interactive map 502 may be filtered to show only popular attractions 504-5 and 504-8.

The popular site features within the site premises may be determined based on feedback such as user ratings of site features received from user devices. For example, server subsystem 202 may receive user ratings of site features from user devices, aggregate the user ratings data, and use the user ratings data to identify popularity levels of site features within the site premises. Server subsystem 202 may make site feature popularity data available to one or more user devices.

The user of the mobile device may utilize site feature popularity data such as visual indicators 702-1 and 702-2 of popular attractions 504-5 and 504-8 within the site premises in any suitable way. For example, the user of the mobile device may plan to visit one or more of the popular attractions 504-5 and 504-8.

Figure 8:
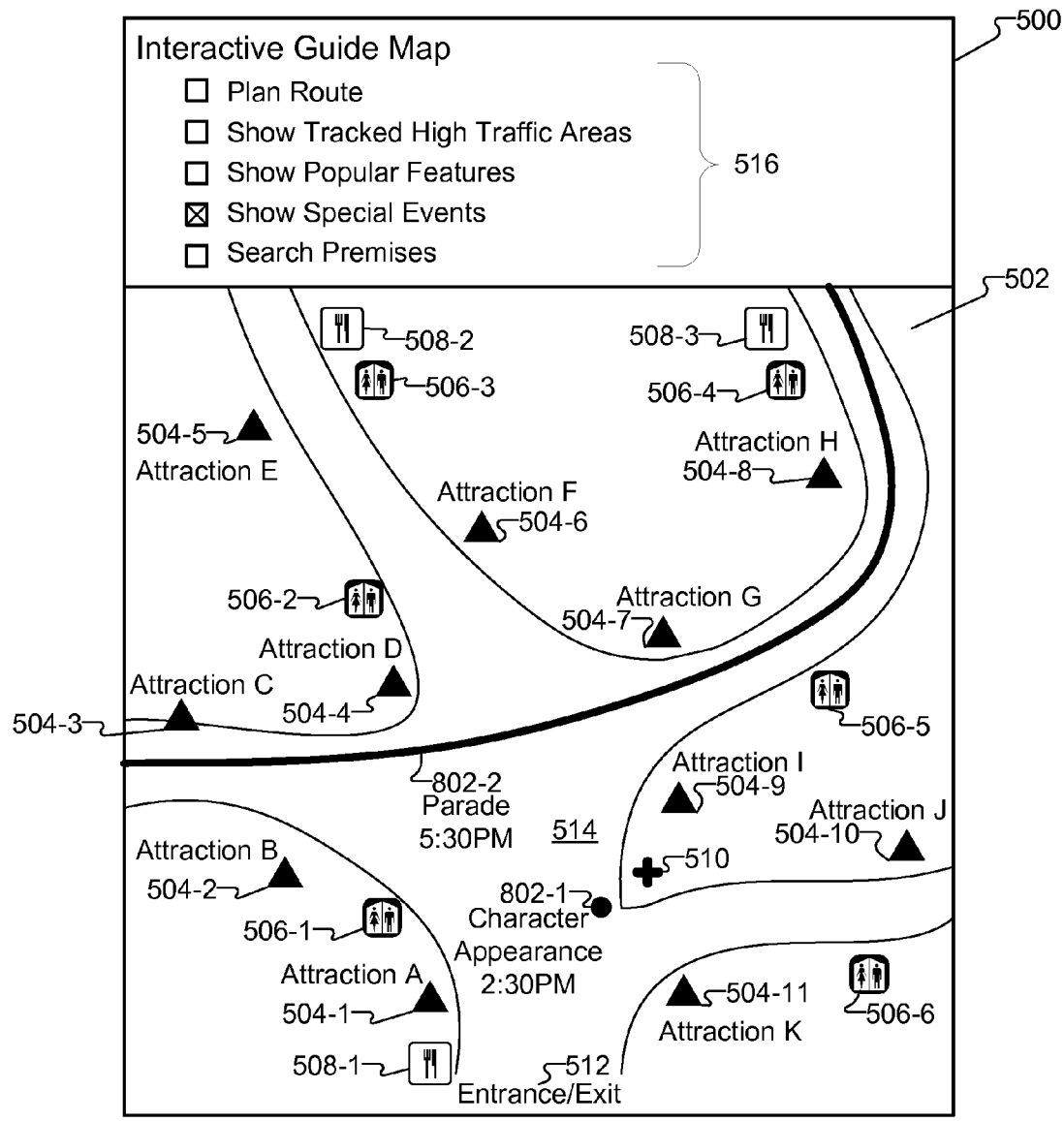

When the user of the mobile device selects the "show special events" option, the mobile device may detect the user selection and update GUI 500 to visually indicate one or more special events within the site premises. For example, FIG. 8 illustrates GUI 500 with visual indicators 802 (e.g., visual indicators 802-1 and 802-2) of special events (e.g., a character appearance and a parade) and locations of the special events within the site premises displayed therein. The times and locations of special events within the site premises may be determined based on site data provided by an operator of the site premises and displayed within GUI 500.

The user of the mobile device may utilize the visual indicators 802 of special events within the site premises in any suitable way. For example, the user of the mobile device may plan to visit one or more of the special events.

When the user of the mobile device selects the "search premises" option, the mobile device may detect the user selection and provide one or more tools to facilitate user input of search terms (e.g., keywords). The mobile device may receive and use the search terms to initiate a search of site data associated with the site premises. As an example, the user of the mobile device may request that the site data be searched to determine whether the site premises includes a location that serves a particular type of food (e.g., a hamburger) or sells a particular product (e.g., a souvenir).

Figure 9:
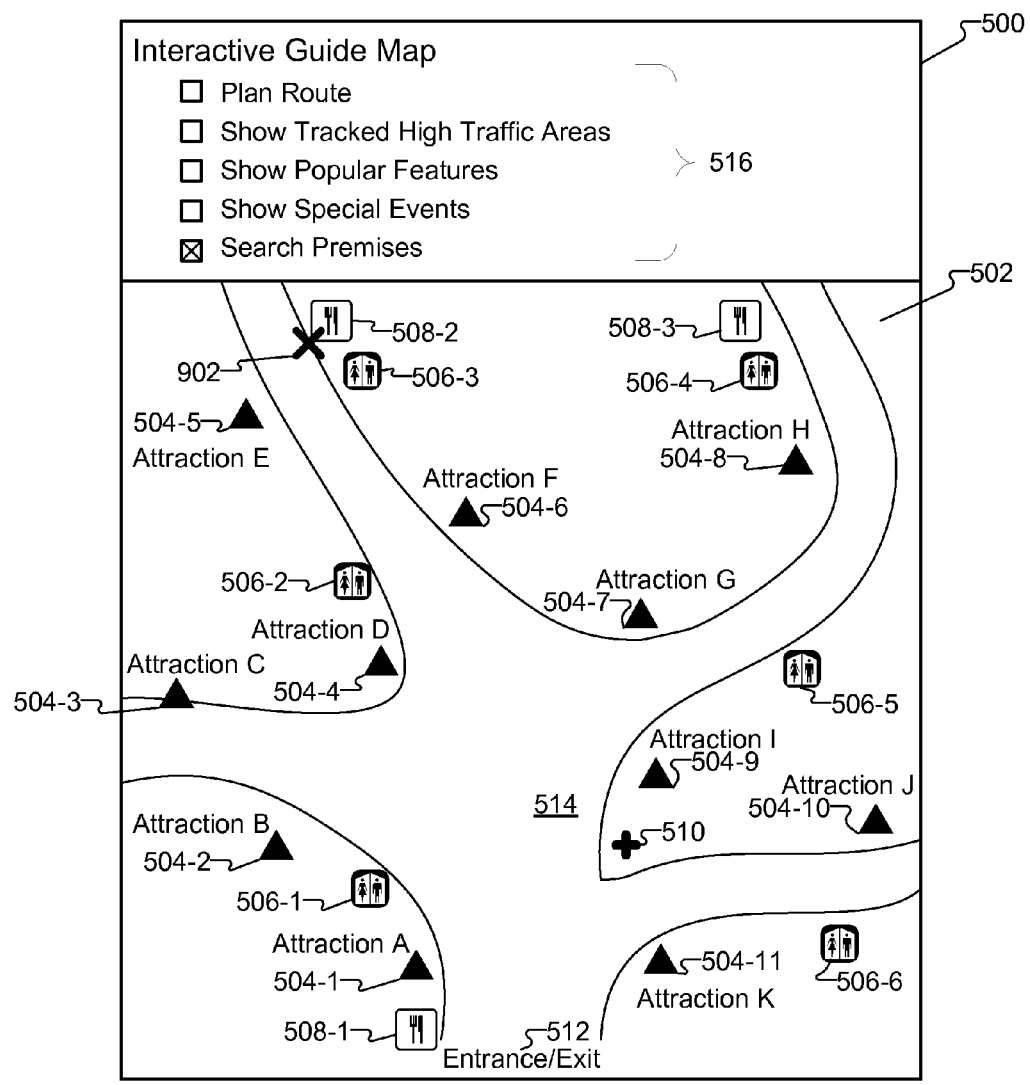

The mobile device may provide search results to the user. For example, when a match is found in the site data, a visual indicator of the match and/or a location of the match within the site premises may be displayed within interactive map 502. FIG. 9 illustrates GUI 500 with a visual indicator 902 indicating a location associated with a match to a premises search displayed therein. For example, the search may have been for an eatery that serves hamburgers, and the visual indicator 902 may indicate a location of an eatery with the site premises that server hamburgers. Site features that are determined to match search terms may be referred to as search results site features and may be visually indicated within interactive map 502 such as by displaying a visual indicator 902 at a search result site feature within interactive map 502.

When the user of the mobile device selects the "plan route" option, the mobile device may detect the user selection and provide one or more tools configured to facilitate a user definition of a planned route within the site premises. For instance, one or more tools may be provided in GUI 500 to help the user interact with interactive map 502 to define and/or modify a route within the site premises. As an example, options 516 may be utilized by the user to access information about the site premises that may be helpful for planning a route within site premises. To define a planned route, the user may select visual indicators of site features within interactive map 502 to indicate site features to be included in the planned route. This may include selecting visual indicators of site features within interactive map 502 in turn to indicate an order by which the site features are to be visited. To illustrate, the user may select a first site feature within interactive map 502 to be a starting location for a route. Next, the user may select a second site feature within interactive map 502 to be the next site feature along the route. The mobile device may detect the selections and identify a proposed route connecting the starting location to the location of the next feature. Site data for the site premises may be used to identify the proposed route. In some examples, GUI 500 may include one or more tools configured to allow the user to modify a proposed route such as by dragging and dropping a point along the route to modify the route. In this or a similar manner, the user of mobile device may utilize one or more tools within GUI 500 to define a planned route within the site premises. Route planning tools may be provided when the mobile device is located within the site premises and/or before the user visits the site premises. Accordingly, the tools may be utilized by the user to pre-plan a route for a future visit to the site premises and/or to plan a route during a visit to the site premises.

Figure 10:
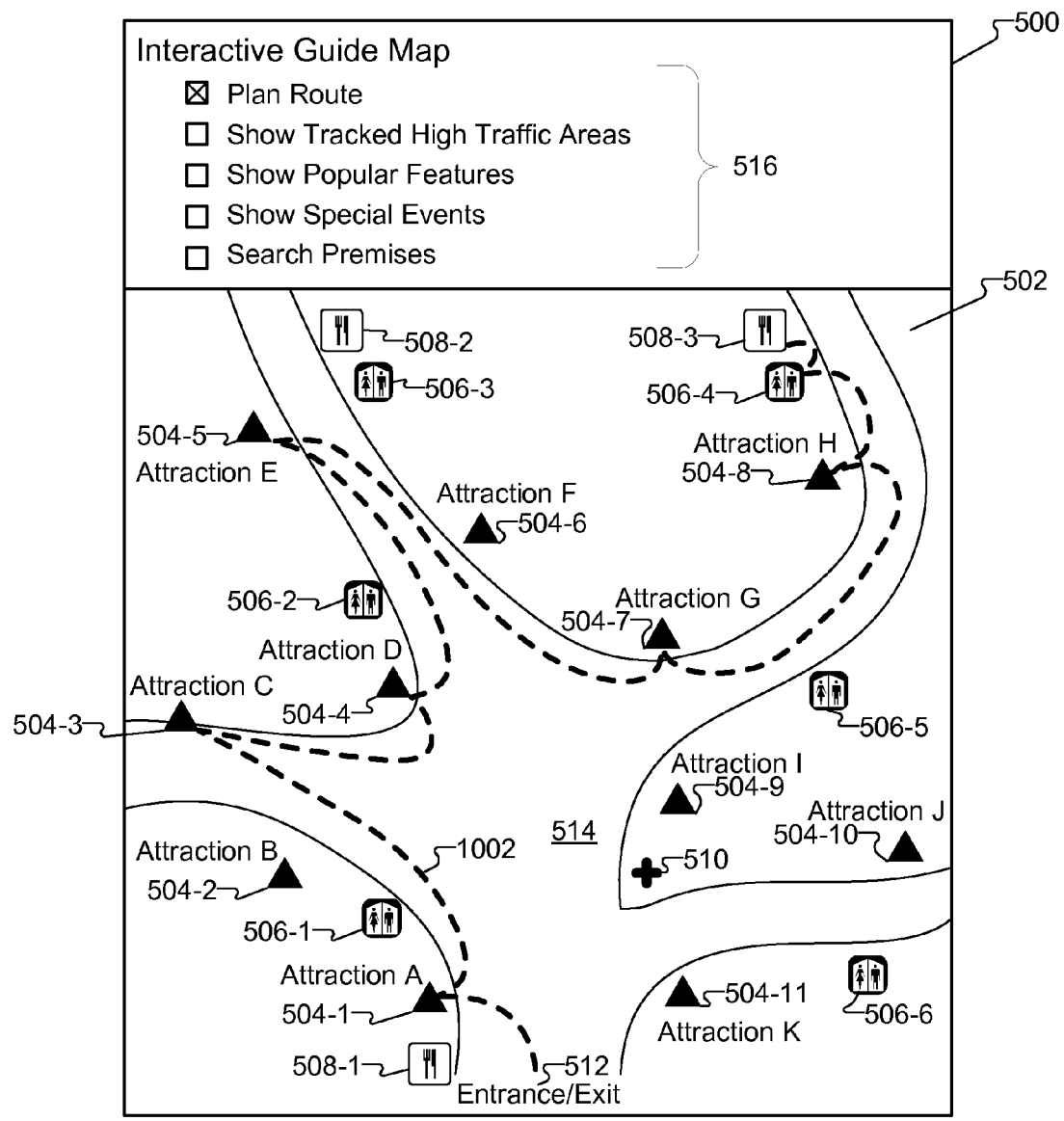

FIG. 10 illustrates GUI 500 with a representation of a planned route 1002 displayed within interactive map 502. As shown, planned route 1002 indicates a course of travel from the entrance/exit 512, to attraction 504-1, to attraction 504-3, to attraction 504-4, to attraction 504-5, to attraction 504-7, to attraction 504-8, to restroom 506-4, and to eatery 508-3 within the site premises. Planned route 1002 may represent a user-defined planned course of travel within the site premises.

In certain embodiments, system 100 may be configured to propose one or more routes to the user of the mobile device. Such proposed routes may include planned routes previously created by the user, actual routes previously traveled by the user within the site premises, planned routes created and shared by other users, actual routes of other users within the site premises, popular planned and/or actual routes within the site premises, and routes that include only popular site features. The user of mobile device may be able to select any of the proposed routes to be a planned route.

A planned route defined and/or selected by the user of the mobile device may be saved for future use. In particular, a planned route such as planned route 1002 may be used to guide the user within the site premises during a user visit to the site premises.

Interactive GUI 500 and the various views of GUI 500 shown in FIGS. 5-10 are illustrative only. Other interactive GUIs, GUI views, and/or tools may be provided in other embodiments to facilitate user access of and interaction with site data associated with a site premises.

Figure 11:
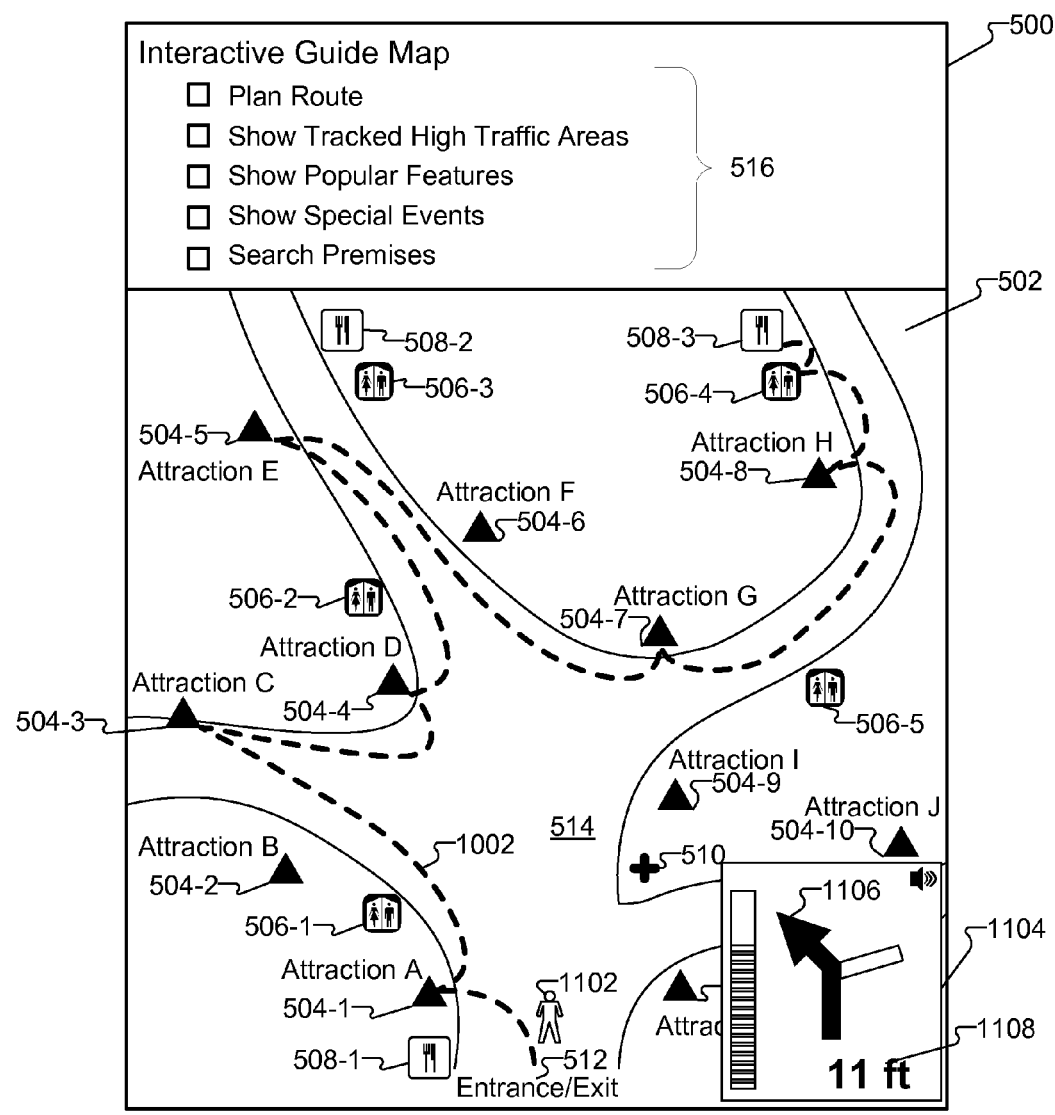

When the mobile device is detected to be within the site premises, certain processes, operations, tools, outputs, and/or options may be automatically activated and/or provided to help enhance the user's visit to the site premises. In certain embodiments, for example, the mobile device may provide output for experiencing by the user of the mobile device based on the detected geographic location of the mobile device within the site premises. For example, the mobile device may automatically display GUI 500 including interactive map 502 of at least a portion of the site premises displayed therein. In addition, GUI 500 may include a visual indicator of the geographic location of the mobile device within the site premises. FIG. 11 illustrates GUI 500 with a visual indicator 1102 (e.g., "You Are Here") of the geographic location of the mobile device displayed within interactive map 502. As the mobile device is moved within the site premises, the position of visual indicator 1102 may be updated within interactive map 502.

In addition, if the user of the mobile device has previously defined or selected a planned route within the site premises, the mobile device may detect that the planned route is associated with the user's visit (e.g., based on the date and/or time of the visit) to the site premises and may visually indicate the planned route (e.g., planned route 1002) within interactive map 502. Accordingly, the user may view his current location within the site premises relative to planned route 1002 and/or one or more site features within site premises, which may help guide the user along the planned route 1002 and/or to one or more features within the site premises.

In addition, the mobile device may be configured to provide express directions from the detected geographic location of the mobile device to another location within the site premises. For example, FIG. 11 illustrates visually indicated directions 1104 including a directional arrow 1106 displayed within GUI 500. Directional arrow 1106 may indicate at least one direction of travel from the geographic location of mobile device to another geographic location within the site premises. For example, directional arrow 1106 may indicate a direction of travel to a geographic location of a particular site feature within the site premises. As another example, directional arrow 1106 may indicate a direction of travel to a geographic location of a point along planned route 1002, which may guide the user of the mobile device in following the planned route 1002. In addition, the directions 1104 may include an indication 1108 of a distance from the geographic location of the mobile device to another geographic location within the site premises. The directions 1104 output by the mobile device may assist the user in locating and traveling to a feature and/or following a planned route 1002 within the site premises. In FIG. 11, for example, directions 1104 may guide the user from the current location of the mobile device (e.g., the location indicated by visual indicator 1102) to the next site feature included along planned route 1002 (e.g., attraction 504-1). As an alternative example, directions provided by the mobile device may include a visual indication of an optimal path of travel from the geographic location of the mobile device to another geographic location within the site premises.

Figure 12:
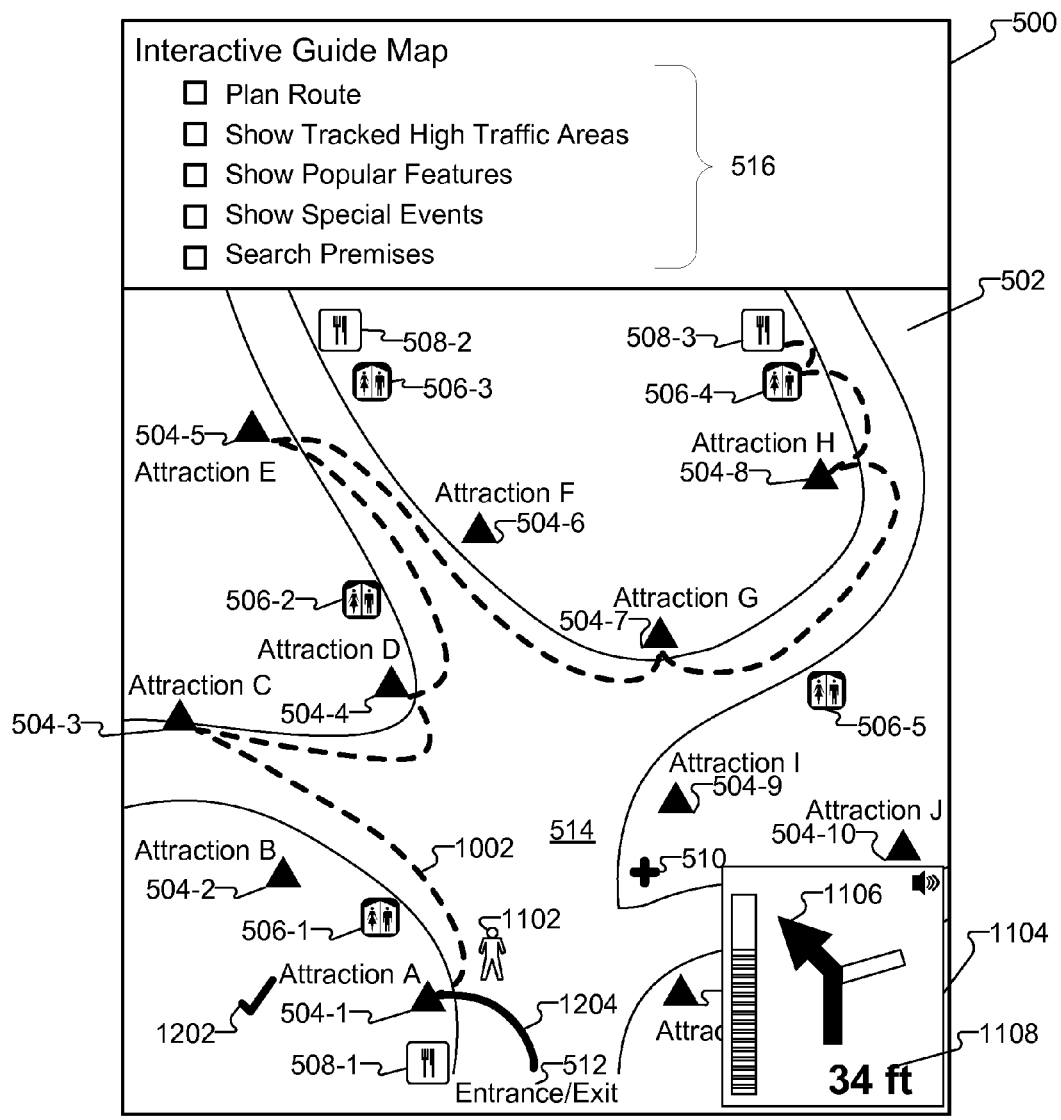

The mobile device may be configured to provide additional tools and/or output configured to guide the user of the mobile device along planned route 1002 within the site premises. For example, the mobile device may provide output indicating site features and/or other points along planned route 1002 that have been visited by the user of the mobile device. To illustrate, FIG. 12 shows a visual indicator 1202 within GUI 500 indicating that attraction 504-1 included along planned route 1002 has been visited by the user of the mobile device. A determination that the user has visited a site feature within the site premises may be made in any suitable way. For example, the tracked geographical location of the mobile device may be compared with site data specifying a location associated with the site feature. When the tracked geographic location of the mobile device is determined to be within a predefined distance of the location of the site feature, the mobile device may determine that the user has visited the site feature. In certain embodiments, a time component may be included in the determination such that the mobile device is configured to determine that the user has visited the site feature when the geographic location of the mobile device is determined to within the predefined distance of the location of the site feature for a predefined period of time. This may help prevent incorrectly crediting the user for visiting the site feature when the user merely passes by without experiencing the site feature.

In addition, FIG. 12 illustrates another visual indicator 1204 within GUI 500 indicating a segment of planned route 1002 as completed. In the illustrated example, the visual indicator 1204 includes a change from a dashed line representing an uncompleted section of planned route 1102 to a solid line representing a completed section of planned router 1102. The tracked geographic location of the mobile device may be used to determine when the user of the mobile device has traveled along and completed a section of planned route 1002. When this determination is made, visual indicator 1204 may be output and displayed in GUI 500 to mark the completed section of planned route 1002 as complete. The determination may be made in any suitable way. For example, the tracked geographic location of the mobile phone may be compared to one or more geographic locations of points along planned route 1002. Additionally or alternatively, a determination that the user has visited a site feature located at an end of a segment of planned route 1002 may be used to determine that the user has traveled along and completed the segment of planned route 1002 leading to the site feature.

Figure 13:
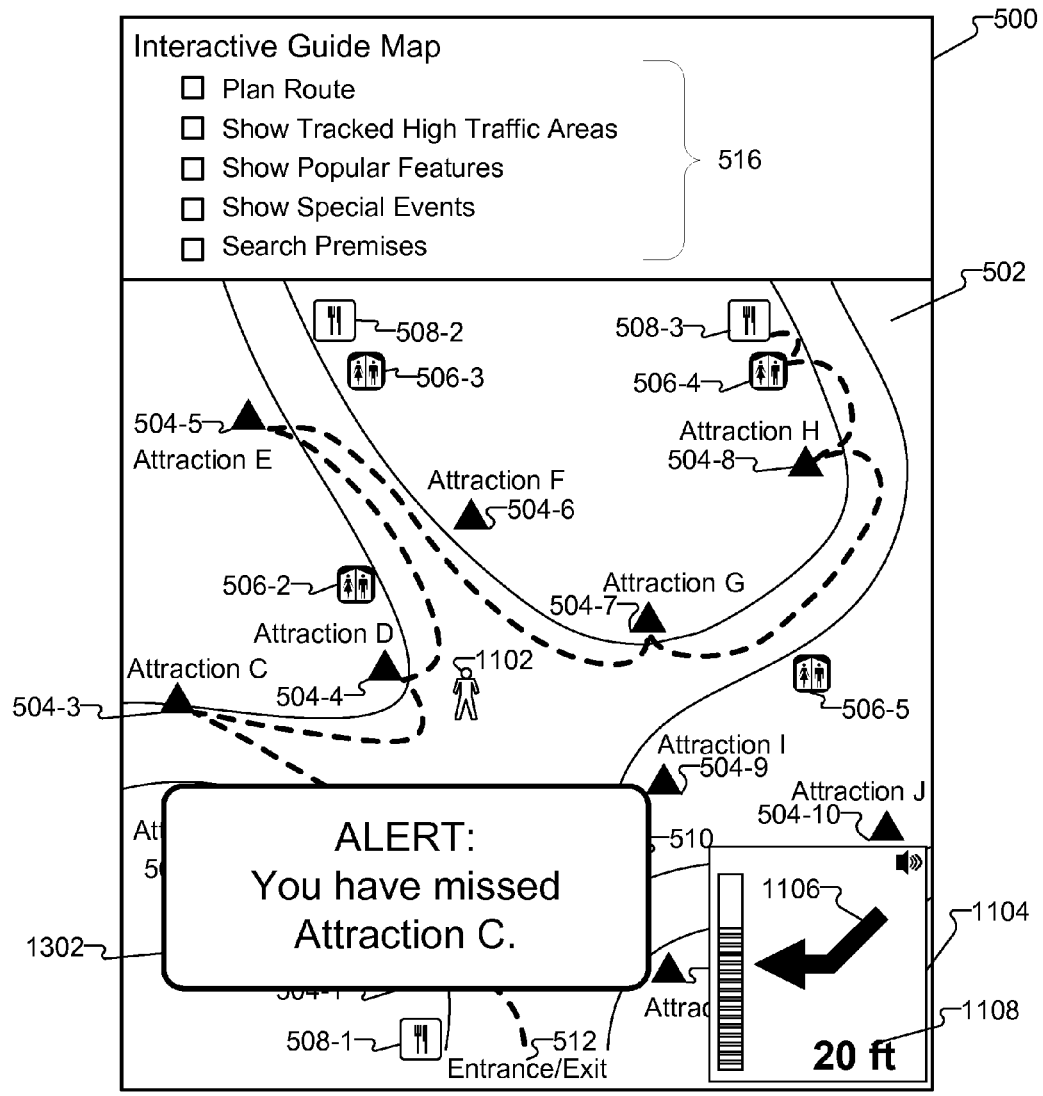

The mobile device may be configured to provide output in the form of one or more alerts, which may include alerts configured to help guide the user of the mobile device along planned route 1002 within the site premises. For example, if the user of the mobile device deviates from planned route 1002, the mobile device may detect the deviation and output an appropriate alert to the user. To illustrate, if the user of the mobile device visits attraction 504-1 and then unintentionally bypasses attraction 504-3 and travels directly to attraction 504-4, the mobile device may determine, based on the tracked location of the mobile device, that the user has bypassed attraction 504-3. In response, the mobile device may provide an alert configured to notify the user that attraction 504-3 has been bypassed. FIG. 13 illustrates an exemplary alert 1302 displayed within GUI 500 and configured to notify the user of the mobile device that he has missed attraction 504-3 ("Attraction C"). Accordingly, the user may be notified that he has bypassed a site feature along planned route 1002 and may take corrective action if desired. In some examples, the mobile device may provide output configured to guide the user to the bypassed attraction 504-3. As illustrated in FIG. 13, for example, directions 1104 may be configured to direct the user to the bypassed attraction 504-3. In some examples, the mobile device may provide output in the form of an image and/or a virtual tour of the bypassed site feature.

Figure 14:
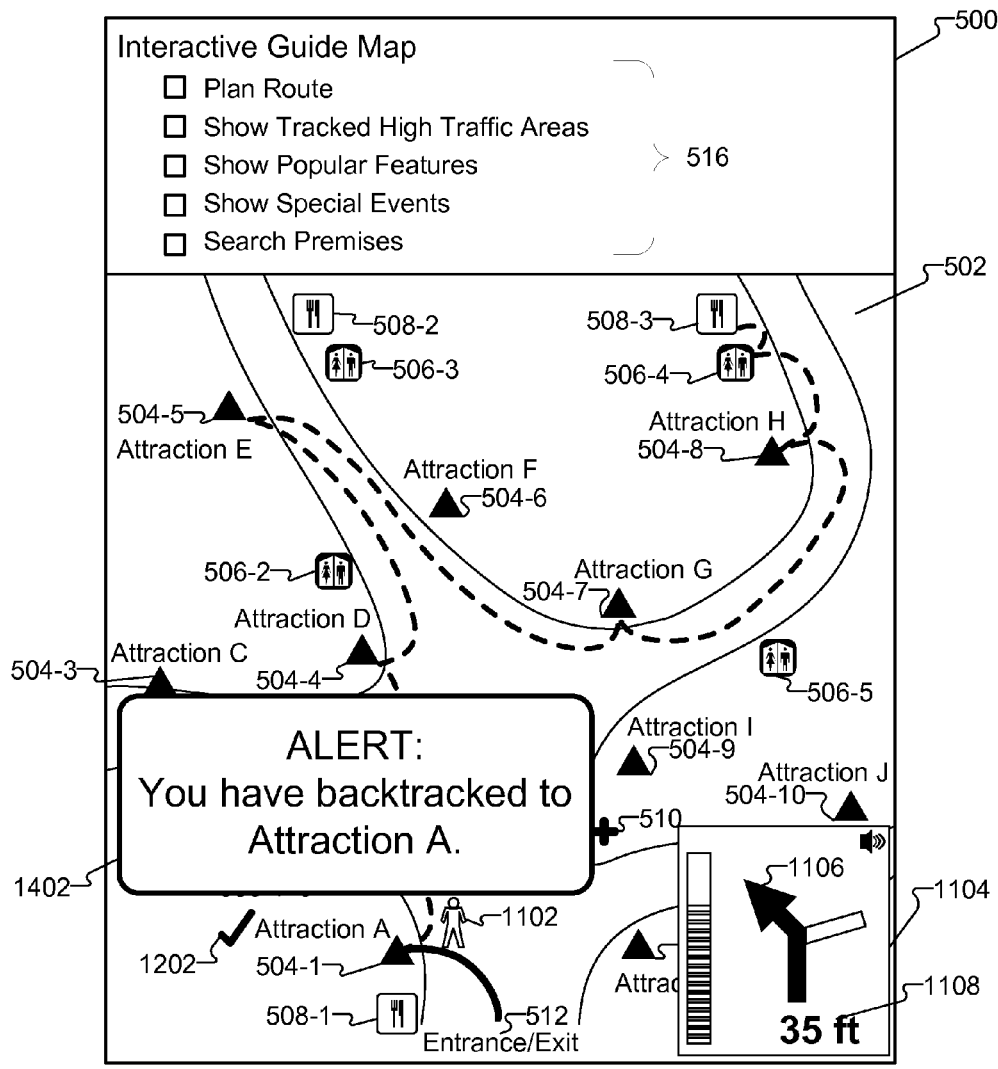

As another example, if the user of the mobile device visits attraction 504-1 and later unintentionally backtracks to attraction 504-1, the mobile device may determine, based on the tracked location of the mobile device, that the user has backtracked to attraction 504-1, and thereby deviated from planned route 1002. In response, the mobile device may provide an alert configured to notify the user that he has backtracked to attraction 504-1. FIG. 14 illustrates an exemplary alert 1402 displayed within GUI 500 and configured to notify the user of the mobile device that he has backtracked to attraction 504-1 ("Attraction A"). Accordingly, the user may be notified that he has backtracked to a site feature along planned route 1002 and may take corrective action if desired. In some examples, the mobile device may provide output configured to guide the user away from the revisited attraction 504-1 and to another site feature (e.g., the next site feature along planned route 1002) within the site premises. As illustrated in FIG. 14, for example, directions 1104 may be configured to direct the user from attraction 504-1 to attraction 504-3, which is the next feature along planned route 1002 that has not yet been marked as visited by the user.

In certain embodiments, system 100 may provide one or more tools configured to allow the user to customize one or more alerts, including creating one or more location-based alerts. For example, while visiting the site premises, the user of the mobile device may feel a need to visit a restroom soon. Instead of immediately searching for a restroom, the user may create a custom alert configured to notify the user when he is within a select distance of a restroom within the site premises. This may allow the user to continue enjoying one or more attractions within the site premises and rely on the mobile device to alert him when he is near a restroom that he may visit with minimal interruption to his activities. In some examples, the mobile device may also provide output configured to guide the user to the restroom that has been identified as being proximate to the geographic location of the user's mobile device. For example, the mobile device may output directions configured to direct the user to the restroom.

Figure 15:
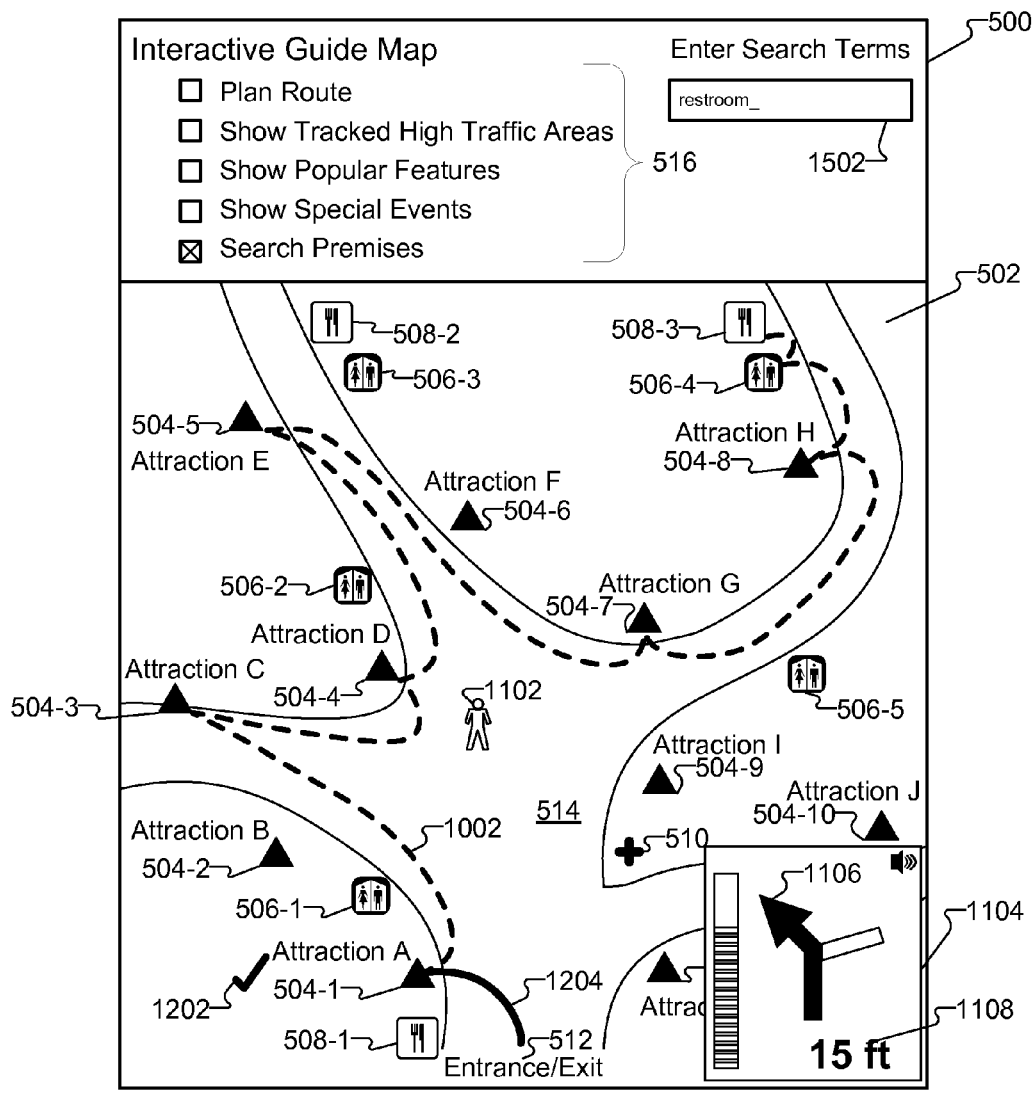
Figure 16:
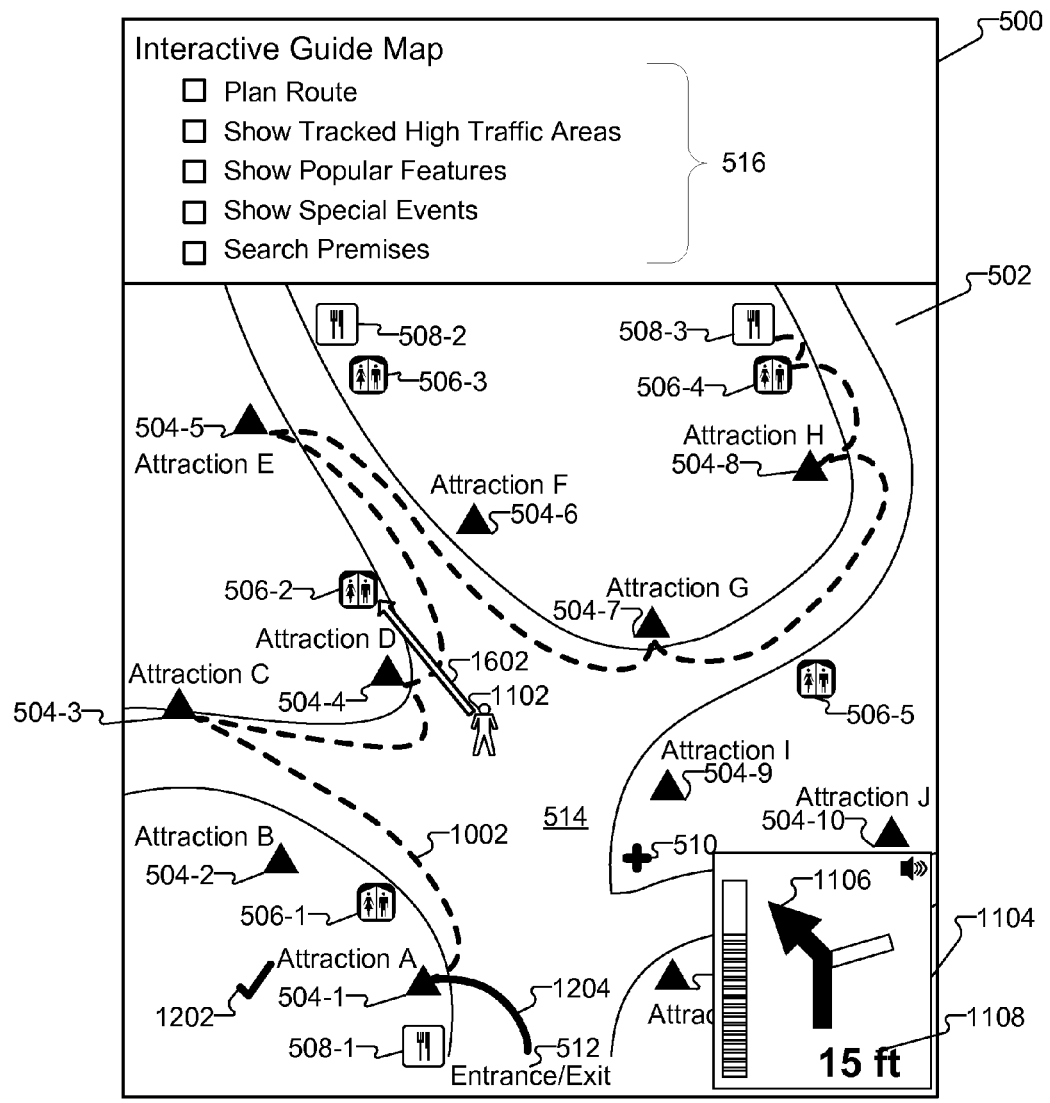

In certain embodiments, system 100 may be configured to provide directions to a site feature within a site premises on demand. For example, while visiting the site premises, the user of the mobile device may feel an immediate need to visit a restroom. The mobile device may provide the user with one or more tools for locating a nearby restroom based on the tracked geographic location of the mobile device. To illustrate, FIG. 15 illustrates a search tool 1502 configured to receive user input specifying one or more search terms. The user may input "restroom" as a search term. In response to the search request, system 100 may search site data to identify one or more nearby restrooms within the site premises based on the geographic location of the mobile device. The mobile device may provide output indicating one or more identified restrooms that are located proximate to the geographic location of the mobile phone. In some examples, the mobile device may also provide output configured to guide the user to the restroom that has been identified as being most proximate to the geographic location of the user's mobile device. For example, the mobile device may output directions configured to direct the user to the restroom. FIG. 16 illustrates exemplary directions displayed in GUI 500 and configured to guide the user to the restroom 506-2 that has been identified as being most proximate to the geographic location of the user's mobile device. The exemplary directions may include a visual indicator 1602 indicating an optimal path from the geographic location of the user's mobile device to restroom 506-2. Additionally or alternatively, direction arrow 1106 and distance indicator 1108 within directions 1104 may indicate at least one direction of travel and a distance from the geographic location of the user's mobile device to restroom 506-2.

As another example of output configured to enhance a visit to a site premises, the mobile device may be configured to provide a virtual tour of the site premises and/or one or more site features within the site premises. The virtual tour may include a presentation of media content in any suitable format, including, without limitation, audio, video, photos, slideshows, and multimedia presentations about the site premises and/or one or more site features within site premises.

In certain embodiments, a virtual tour may be provided based on the geographic location of the mobile device within the site premises. For example, when the mobile device is detected to be within a predefined distance of a site feature within the site premises for at least a predefined period of time, the mobile device may automatically access and output a presentation of a virtual tour of the site feature. In some examples, the virtual tour may include playback of media content (e.g., audio and/or video) about the site feature that is designed to enhance the user's experience with the site feature. As another example, the mobile device may be configured to offer a virtual tour to the user in response to a determination that the user has bypassed or otherwise missed one or more site features during a visit to the site premises. In such cases, the virtual tour may be tailored to cover only the missed site features. Accordingly, if the user is unable to visit all site features during a visit to a site premises, the user may be provided with an opportunity to experience a virtual tour of at least those site features not experienced by the user during the visit.

The mobile device may be configured to access virtual tour data from any suitable source. For example, virtual tour data may be included in site data stored locally at the mobile device, remotely at server subsystem 202, or at another remote source accessible by the mobile device.

In certain embodiments, the mobile device may be configured to provide language options, including providing output in one or more languages and/or translating output to one or more languages. Output in various languages and/or translation tools may be accessed from any suitable source by the mobile device.

As another example of enhancing an experience of a user visiting a site premises, in certain examples the mobile device may be configured to provide a treasure hunt event to the user. An operator of the site premises may define a treasure hunt event that allows visitors to the site premises to use mobile devices to participate in the treasure hunt event. The operator of the site premises may provide a reward for users who complete or win the treasure hunt event. Treasure hunt data may be included within site data for the site premises. The treasure hunt data may specify one or more site features within the site premises as treasure hunt items and may ask users participating in the treasure hunt event to find the site features (e.g., "find the oldest human specimen in the museum").

The user of the mobile device may utilize the mobile device to access and participate in a treasure hunt event within the site premises. For example, the mobile device may access and output treasure hunt data such as indications of treasure hunt items and/or hints designed to guide the users to the site features associated with the treasure hunt items. When the geographic location of the mobile device is determined to be within a predefined distance of a site feature associated with a treasure hunt item (e.g., a particular exhibit within a museum), the mobile device may automatically mark (i.e., "auto-credit") the site feature as completed in the treasure hunt event and thereby credit the user of the mobile device for locating the treasure hunt item. In some example, the auto-credit of the treasure hunt item may be further based on a detection of the mobile device being within the predefined distance of the site feature for at least a minimum period of time (e.g., a duration that allows the user to experience the site feature).

In addition, the mobile device may output an alert configured to notify the user of the mobile device that he has been credited for locating a treasure hunt item. The mobile device may also be configured to output an alert configured to notify the user when all treasure hunt items have been successfully located and/or when a winner of the treasure hunt event has been determined.

In certain embodiments, the mobile device may be further configured to provide one or more outputs configured to guide the user of the mobile device to the locations of one or more treasure hunt items within the site premises based on the tracked location of the mobile device. For example, the mobile device may output directions from the geographic location of the mobile device to the location of a treasure hunt item. In certain embodiments, server subsystem 202 may restrict a treasure hunt event to a particular group of users and/or mobile devices.

The mobile device may be configured to provide data associated with a visit to a site premises to server subsystem 202, which may be configured to aggregate and utilize such data. For example, the mobile device may transmit location data for the mobile device to server subsystem 202 for aggregation within location data 114 and use by server subsystem 202 to generate location reports (e.g., high traffic area reports) for inclusion in site data for the site premises. As another example, the mobile device may be configured to prompt the user to provide feedback about a visit to the site premises. The mobile device may transmit user feedback (e.g., user ratings of the site premises and/or one or more site features within the site premises) to server subsystem 202, which may aggregate and include user feedback in the site data for the site premises. Accordingly, an operator of a site premises may receive user location data and/or user feedback related to one or more visits of one or more users to the site premises. The data may be utilized by the operator of the site premises to make one or more changes to the site premises in order to improve future visits of users to the site premises.

In certain embodiments, the mobile device may provide a user interface configured to facilitate a user of the mobile device providing a notification message to an operator of a site premises. As an example, a user visiting a site premises may observe an incident (e.g., an accident such as a spill, fall, or injury or an emergency such as an injury, medical emergency, or fire). The user may utilize an interactive user interface provided by the mobile device to send a message to an operator of the site premises and/or other personnel associated with the site premises. For instance, the user may select a "quick messaging" option within an interactive user interface and create and transmit a message. The message may be automatically routed to one or more communication devices associated with an operator and/or other personnel associated with the site premises. For example, the message may be automatically sent to one or more communication devices associated with an incident management team, security team, and/or other personnel associated with the site premises. Accordingly, a user visiting the site premises may quickly and conveniently utilize an interactive user interface provided by the mobile device to alert the site operator and/or site personnel of an incident within the site premises.

Figure 17:
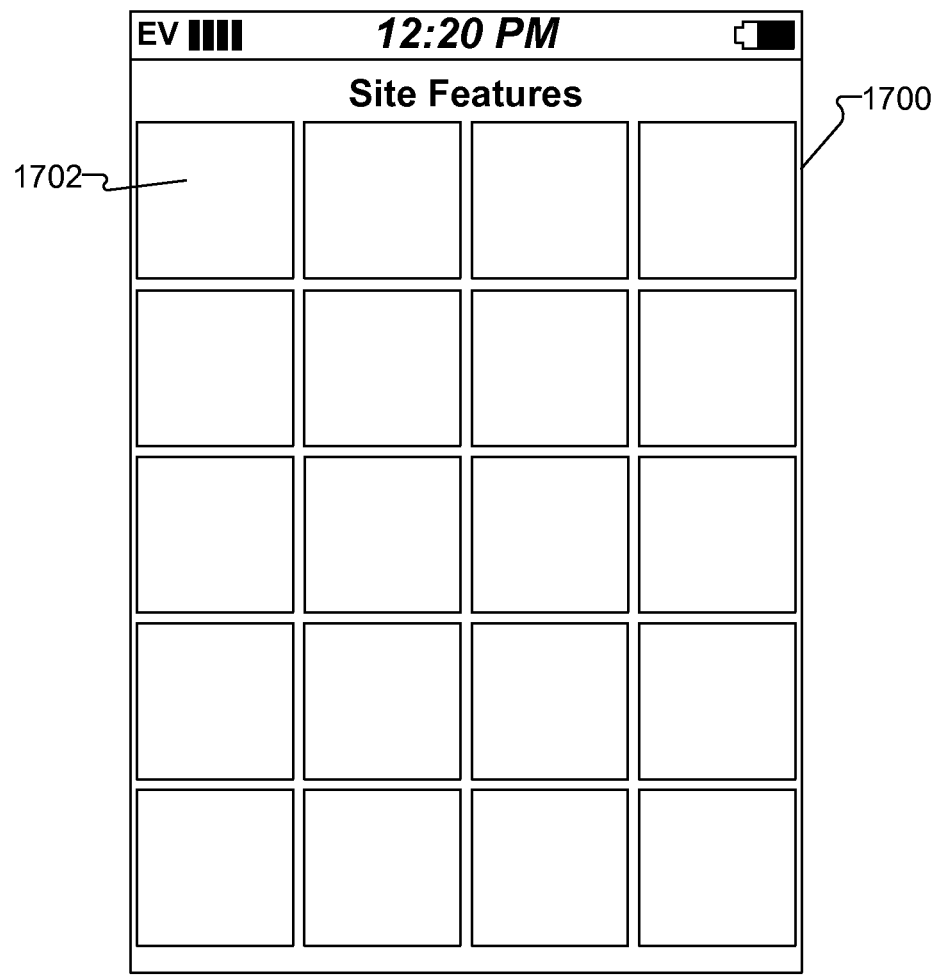
FIG. 17 illustrates another exemplary interactive graphical user interface.

FIG. 17 illustrates another exemplary interactive GUI 1700 configured to enhance a visit of a user of a mobile device to a site premises. GUI 1700 may include thumbnail images of site features located within the site premises. For example, image 1702 displayed in GUI 1700 may include a thumbnail image of a particular site feature within the site premises. The site feature images displayed in GUI 1700 may be configured for use by the user of the mobile device to experience the site features. For example, the user may select image 1702. The mobile device may detect the user selection and respond by performing one or more predetermined operations. As an example, the mobile device may respond by providing output configured to guide the user of the mobile device from the geographic location of the mobile device within the site premises to the location of the selected site feature within the site premises. For instance, the mobile device may display an interactive map of at least a portion of the site premises with a visual indicator indicating an optimal route of travel from the location of the mobile device to the site feature. Additionally or alternatively, directions such as one or more directional arrows and/or a distance from the location of the mobile device to the selected site feature may be displayed. Such a display may be similar to the GUI view shown in FIG. 16. Accordingly, the display of site feature images within GUI 1700 may help the user of the mobile device to select one or more site features to visit and to receive output configured to guide the user to the selected site features. As another example, the site feature images in GUI 1700 may be used to access virtual tours of the site features. When a user selects image 1702 in GUI 1700, for example, the mobile device may detect the selection and playback or provide an option to begin playback of a virtual tour of the site features. GUI 1700 may additionally or alternatively be used by a user of the mobile device or another user device to define a planned route for a future visit to the site premises.

Several exemplary methods of enhancing a user visit to a site premises will now be described. One or more of the steps shown in FIGS. 18-20 may be performed by system 100, server subsystem 202, and/or devices 204, 208, and/or 300.

Figure 18:
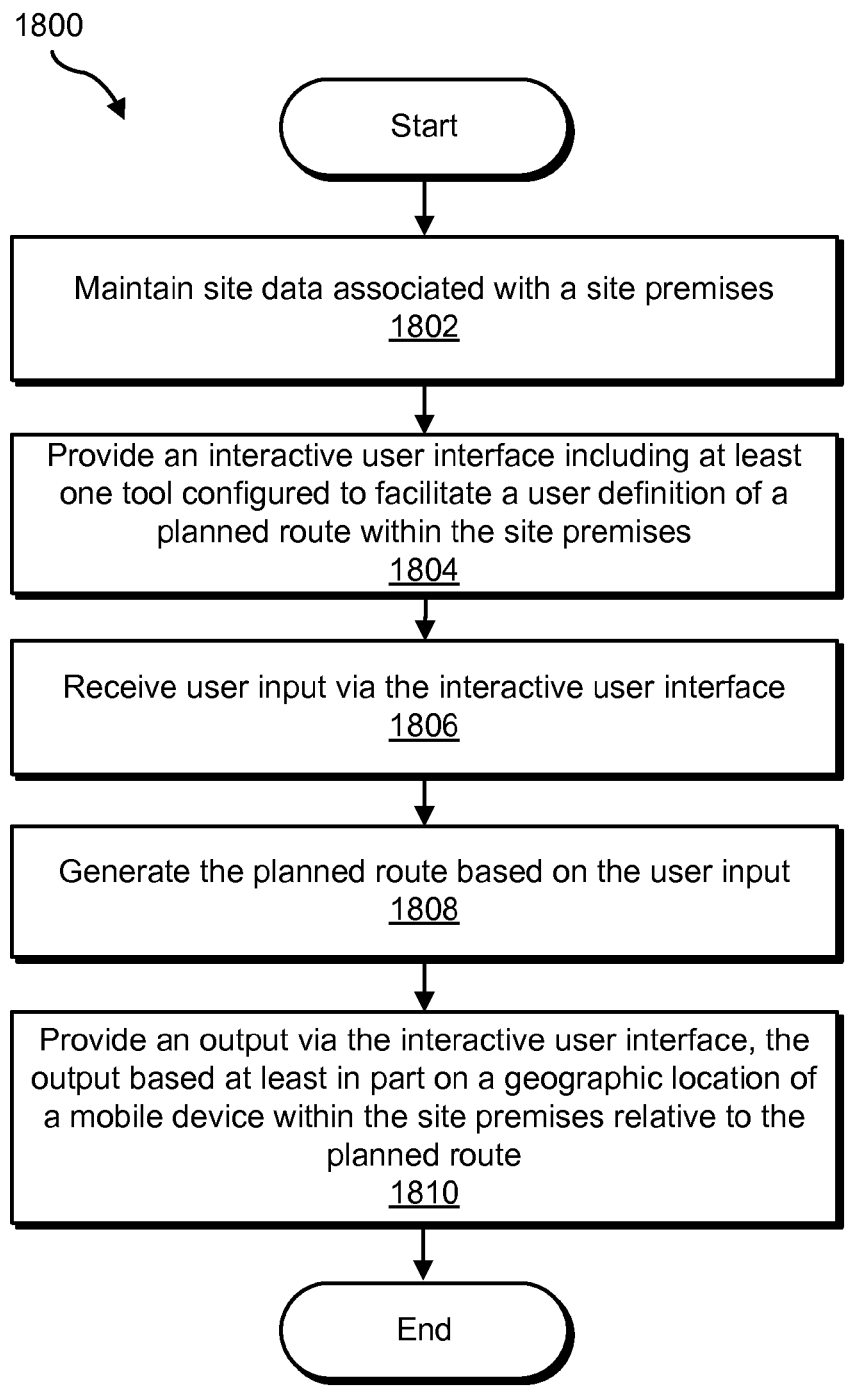
FIGS. 18-20 illustrate exemplary methods of enhancing a user visit to a site premises.

FIG. 18 illustrates an exemplary method 1800 of facilitating user definition and use of a planned route to enhance a user visit to a site premises. While FIG. 18 illustrates exemplary steps according to one embodiment, other embodiments may omit, add to, reorder, and/or modify any of the steps shown in FIG. 18.

In step 1802, site data associated with a site premises is maintained. For example, site data management facility 106 may maintained site data associated with a site premises as described above. Step 1802 may include server subsystem 202 receiving site data from an operator device associated with an operator of the site premises and storing the site data to a data storage facility. Step 1802 may also include a user device 204 associated with a user accessing and/or maintaining site data associated with the site premises.

In step 1804, an interactive user interface including at least one tool configured to facilitate a user definition of a planned route within the site premises is provided. For example, a user device 204 may provide an interactive user interface to a user of the user device 204. The interactive user interface may include one or more of the tools described above that are configured to assist the user with defining a planned route within the site premises.

In step 1806, user input is received via the interactive user interface. The user input may be provided and received in any suitable way. For example, the user input may include one or more user selections of one or more site features located within the site premises to be included in the planned route.

In step 1808, the planned route is generated based on the user input. For example, the user device 204 and/or server subsystem 202 may generate and store data representative of the planned route based on the user input.

In step 1810, an output is provided via the interactive user interface. For example, the user device 204 may provide the output within the interactive user interface for experiencing by the user associated with the user device 204. The output may be based at least in part on the geographic location of a mobile device associated with the user within the site premises relative to the planned route. For example, the output may include directions from the geographic location of the mobile device within the site premises to a site feature and/or another point along the planned route. As another example, the output may include a visual indicator that a site feature along the planned route has been visited by the user.

Figure 19:
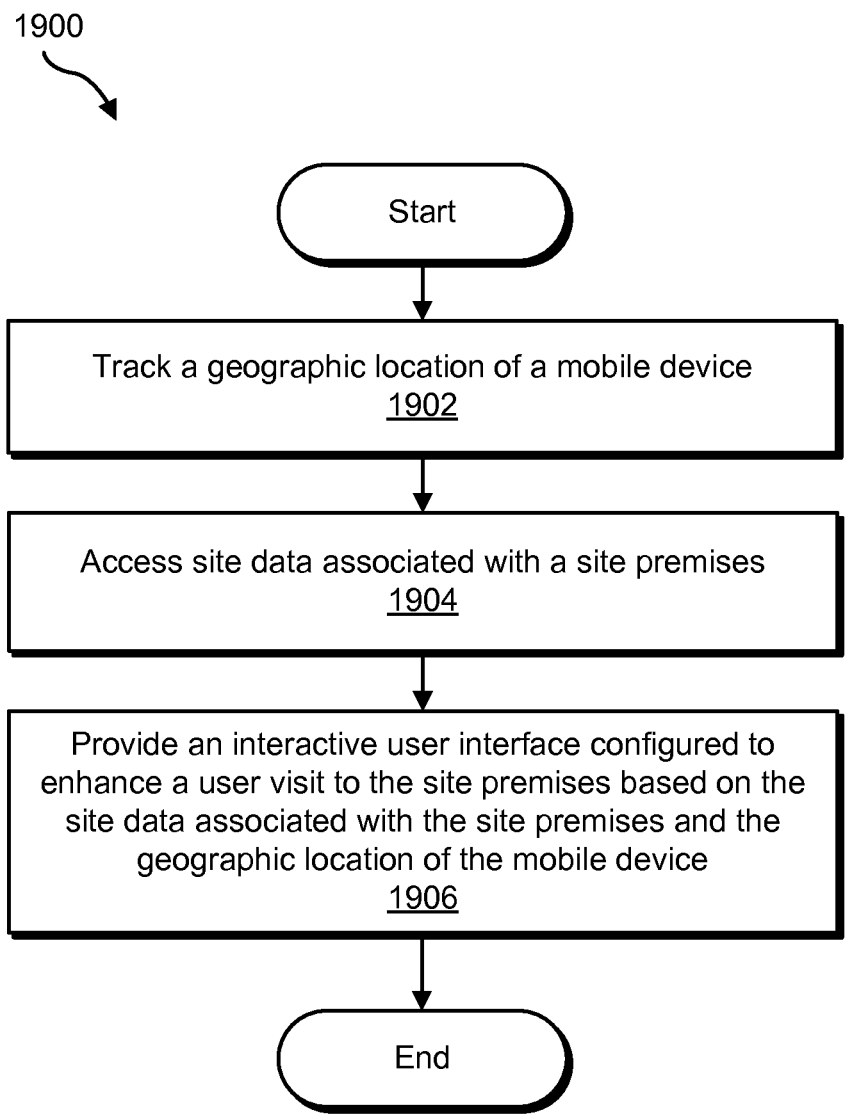

FIG. 19 illustrates an exemplary method 1900 of enhancing a user visit to a site premises. While FIG. 19 illustrates exemplary steps according to one embodiment, other embodiments may omit, add to, reorder, and/or modify any of the steps shown in FIG. 19.

In step 1902, a geographic location of a mobile device is tracked. Step 1902 may be performed in any of the ways described above.

In step 1904, site data associated with a site premises is accessed. For example, the mobile device tracked in step 1902 may access site data maintained by server subsystem 202.

In step 1906, an interactive user interface configured to enhance a user visit to the site premises based on the site data associated with the site premises and the geographic location of the mobile device is provided. The interactive user interface may be configured to enhance the user visit to the site premises in any of the ways described above. For example, the interactive user interface may include one or more of the tools and/or options described above that may be used by a user of the mobile device to enhance the user's visit to the site premises based on the geographic location of the mobile device within the site premises. For example, one or more of the outputs described above may be provided via the interactive user interface for experiencing by the user of the mobile device based on the geographic location of the mobile device within the site premises.

Figure 20:
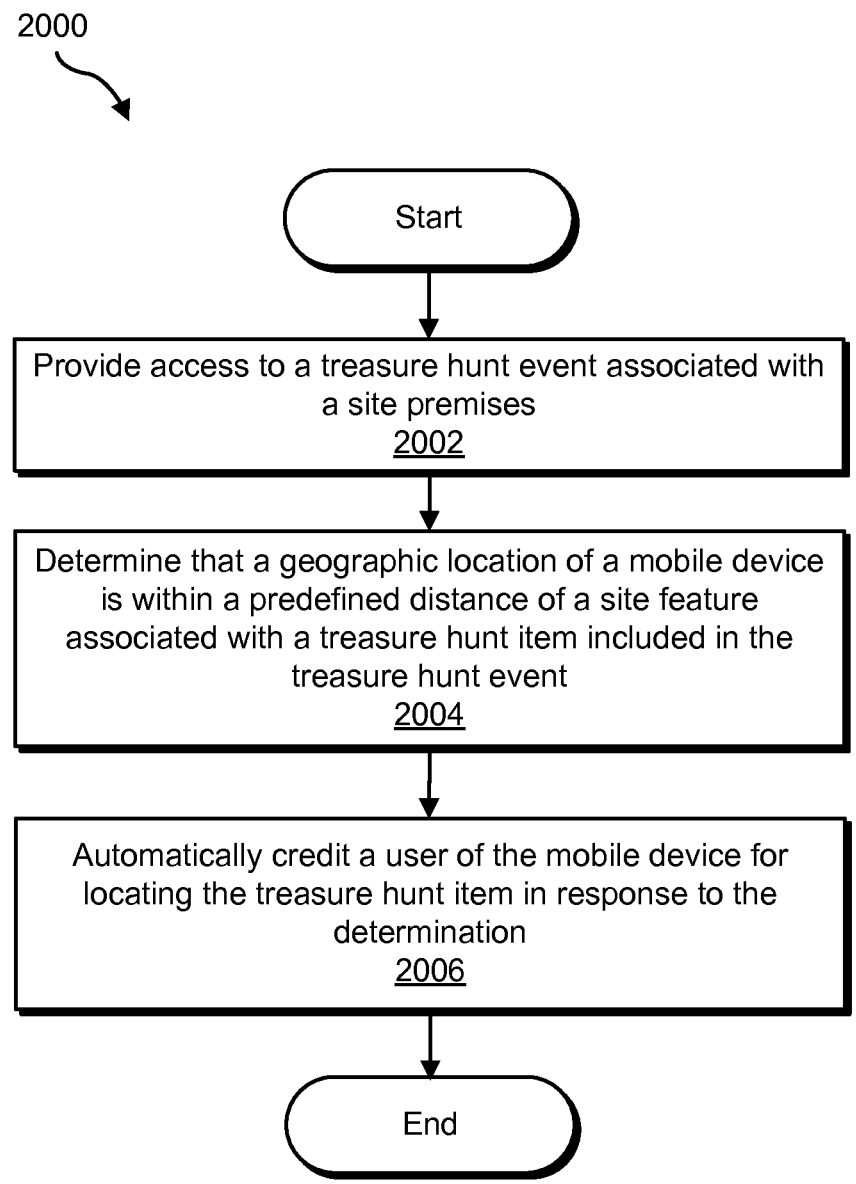

FIG. 20 illustrates an exemplary method 2000 of providing a treasure hunt event within a site premises. While FIG. 20 illustrates exemplary steps according to one embodiment, other embodiments may omit, add to, reorder, and/or modify any of the steps shown in FIG. 20.

In step 2002, access to a treasure hunt event associated with a site premises is provided. For example, server subsystem 202 may receive treasure hunt data from an operator device associated with an operator of the site premises. As described above, the treasure hunt data may be included in the site data associated with the site premises. A mobile device may access the treasure hunt data and utilize the treasure hunt data to provide the treasure hunt event to a user of the mobile device.

In step 2004, a determination is made that a geographic location of the mobile device is within a predefined distance of a site feature associated with a treasure hunt item included in the treasure hunt event. To illustrate, the user of the mobile device may elect to participate in the treasure hunt event. While participating, when the mobile device is located within a predefined distance of a site feature associated with a treasure hunt item included in the treasure hunt event, the mobile device may detect the proximity to the treasure hunt item.

In step 2006, the user of the mobile device is automatically credited for locating the treasure hunt item in response to the determination made in step 2004. In this or a similar manner, a treasure hunt event may be provided in which one or more treasure hunt items may be deemed to be located based on the determined geographic location of the mobile device associated with the user participating in the treasure hunt. This may allow an operator of a site premises to create and provide one or more treasure hunt events for the enjoyment of visitors to the site premises.

While one or more of the above-described examples may relate specifically to a particular type of site premises such as an amusement park and/or a museum, this is illustrative only. One or more of the principles described herein may be applied and/or modified to apply to one or more other types of site premises.

One or more of the processes, operations, services, tools, outputs, and/or options described above may be used to generate revenue for an entity providing the processes, operations, services, tools, outputs, and/or options. To this end, one or more of the components described above may be further configured to perform one or more operations related to generating revenue. Examples of ways that revenue may be generated from the above-described processes, operations, services, tools, outputs, and/or options may include, but are not limited to, billing operators of site premises to upload site data associated with a site premises, selling tickets to special events within a site premises, billing for distribution of advertisements, and billing incremental fees for access to the processes, operations, services, tools, outputs, and/or options described herein.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:
   a location tracking facility that tracks a geographic location of a mobile device;
   a site data management facility that maintains site data for a site premises; and
   an interactive interface facility communicatively coupled to the location tracking facility and the site data management facility and that provides an interactive user interface configured to enhance a visit of a user of the mobile device to the site premises based on the site data for the site premises and the geographic location of the mobile device within the site premises, the interactive user interface including
      an interactive map of at least a portion of the site premises that includes one or more selectable visual indicators of one or more site features located within the site premises, and
      at least one tool configured to receive a user selection of at least one of the one or more selectable visual indicators for inclusion of at least one of the one or more site features in a planned route within the site premises;
   wherein the interactive map visually indicates the planned route and the at least one of the one or more selectable visual indicators along the planned route within the site premises.

2. The system of claim 1, wherein the interactive interface facility provides an output via the interactive user interface for experiencing by the user based on the geographic location of the mobile device within the site premises.

3. The system of claim 2, wherein the output comprises an alert configured to notify the user that the user has missed a site feature along the planned route within the site premises.

4. The system of claim 2, wherein the output comprises an alert configured to notify the user that the user has backtracked to a site feature previously visited by the user along the planned route within the site premises.

5. The system of claim 2, wherein the output comprises a virtual tour of a site feature along the planned route within the site premises.

6. The system of claim 2, wherein the output comprises an automatic presentation of media content associated with a site feature in response to a determination that the geographic location of the mobile device is within a predefined distance of the site feature.

7. The system of claim 2, wherein the output comprises an alert configured to notify the user that the user has been credited for locating a treasure hunt item, wherein the user is credited for locating the treasure hunt item in response to a determination that the geographic location of the mobile device is within a predefined distance of a site feature associated with the treasure hunt item.

8. The system of claim 2, wherein the output comprises directions from the geographic location of the mobile device within the site premises to a site feature within the site premises.

9. The system of claim 2, wherein the output comprises directions configured to guide the user of the mobile device to follow the planned route within the site premises.

10. The system of claim 2, wherein the output comprises a visual indicator of at least one of a completed visit to a site feature included along the planned route within the site premises and a completed segment of the planned route within the site premises.

11. The system of claim 1, wherein the interactive map visually indicates at least one of a high traffic area within the site premises, a popular site feature within the site premises, a special event within the site premises, and a search result site feature associated with the site premises.

12. The system of claim 1, wherein the site premises comprises at least one of an amusement park and a museum.

13. The system of claim 1, further comprising a site operator portal facility communicatively coupled to the site data management facility and configured to receive the site data from an operator device associated with an operator of the site premises.

14. A system comprising:
   a site data management facility that maintains site data associated with a site premises; and
   an interactive interface facility that provides an interactive user interface including
      an interactive map of at least a portion of the site premises that includes one or more selectable visual indicators of one or more site features located within the site premises, and
      at least one tool configured to receive a user selection of at least one of the one or more selectable visual indicators for inclusion of at least one of the one or more site features in a planned route within the site premises;
   wherein the interactive map visually indicates the planned route and the at least one of the one or more selectable visual indicators along the planned route within the site premises.

15. The system of claim 14, wherein the at least one tool comprises a user selectable option for visually indicating at least one of a high traffic area, a popular site feature, a special event, and a search result site feature associated with the site premises within the interactive map.

16. The system of claim 14, wherein the site premises comprises at least one of an amusement park and a museum.

17. A method comprising:
   tracking, by a mobile device, a geographic location of the mobile device;
   accessing, by the mobile device, site data associated with a site premises;
   providing, by the mobile device, an interactive user interface configured to enhance a visit of a user of the mobile device to the site premises based on the site data associated with the site premises and the geographic location of the mobile device within the site premises, the interactive user interface including an interactive map of at least a portion of the site premises that includes one or more selectable visual indicators of one or more site features located within the site premises, and at least one tool configured to receive a user selection of at least one of the one or more selectable visual indicators for inclusion of at least one of the one or more site features in a planned route within the site premises; and receiving, by the mobile device via the at least one tool, the user selection of the at least one of the one or more selectable visual indicators for inclusion of the at least one of the one or more site features in the planned route.

18. The method of claim 17, wherein the interactive user interface is configured to enhance the user visit to the site premises by providing an output for experiencing by the user based on the geographic location of the mobile device within the site premises.

19. The method of claim 18, wherein the output comprises at least one of an alert configured to notify the user that the user has missed a site feature within the site premises, one or more directions from the geographic location of the mobile device within the site premises to the missed site feature within the site premises, an image of the missed site feature, and a virtual tour of the missed site feature.

20. The method of claim 18, wherein the output comprises at least one of an alert configured to notify the user that the user has backtracked to a previously visited site feature within the site premises and directions away from the previously visited site feature to another site feature within the site premises.

21. The method of claim 17, further comprising:
providing, by the mobile device via the interactive user interface, access to a treasure hunt event within the site premises;
determining, by the mobile device, that the geographic location of the mobile device is within a predefined distance of a site feature associated with a treasure hunt item included in the treasure hunt event; and
automatically crediting, by the mobile device, the user of the mobile device for locating the treasure hunt item in response to the determination.

22. The method of claim 17, wherein:
the at least one tool visually indicates at least one of a high traffic area within the site premises, a popular site feature within the site premises, a special event within the site premises, and a search result site feature associated with the site premises within the interactive map.

23. The method of claim 17, wherein the interactive user interface includes a plurality of images of a plurality of site features located within the site premises;
wherein the method further comprises:
detecting, by the mobile device, a user selection of an image included in the plurality of images; and
providing, by the mobile device, an output configured to guide the user of the mobile device from the geographic location of the mobile device within the site premises to a location of a site feature corresponding to the selected image.

24. The method of claim 17, embodied as computer-executable instructions on at least one tangible computer-readable medium.

25. The system of claim 1, wherein the at least one tool is configured to detect a selection by the user of a selectable visual indicator of a first site feature within the site premises and a selectable visual indicator of a second site feature within the site premises and identify, based on the site data for the site premises, at least one proposed route connecting the first site feature and second site feature.

26. The system of claim 25, wherein the at least one proposed route comprises at least one of:
a route within the site premises previously created by the user;
a route within the site premises previously traveled by the user;
a route within the site premises created by another user;
a route within the site premises previously traveled by another user;
a popular route within the site premises; and
a route that includes one or more popular site features within the site premises.

27. The system of claim 26, wherein the at least one tool is configured to propose the at least one proposed route to the user via the interactive user interface and detect a selection by the user, via the interactive user interface, of a proposed route as the planned route.

28. The method of claim 17, further comprising:
detecting, by the mobile device, that the geographic location of the mobile device is within the site premises,
wherein the providing of the interactive user interface comprises automatically providing the interactive user interface on a display associated with the mobile device in response to the detecting.

* * * * *